US012614645B2

(12) United States Patent
Robertson et al.

(10) Patent No.: US 12,614,645 B2
(45) Date of Patent: Apr. 28, 2026

(54) SYSTEMS, APPARATUS AND METHODS FOR SEPARATING ACTINIUM, RADIUM, AND THORIUM

(71) Applicants: TRIUMF Inc., Vancouver (CA); THE UNIVERSITY OF BRITISH COLUMBIA, Vancouver (CA)

(72) Inventors: Andrew Kyle Henderson Robertson, Vancouver (CA); Hua Yang, Vancouver (CA); Stefan Zeisler, Vancouver (CA); Paul Schaffer, Vancouver (CA)

(73) Assignees: THE UNIVERSITY OF BRITISH COLUMBIA, Vancouver (CA); TRIUMF INC., Vancouver (CA)

( * ) Notice: Subject to any disclaimer, the term of this patent is extended or adjusted under 35 U.S.C. 154(b) by 0 days.

(21) Appl. No.: 18/239,013

(22) Filed: Aug. 28, 2023

(65) Prior Publication Data

US 2023/0402200 A1 Dec. 14, 2023

Related U.S. Application Data

(62) Division of application No. 17/040,652, filed as application No. PCT/CA2019/050370 on Mar. 26, 2019, now Pat. No. 11,798,700.

(60) Provisional application No. 62/723,112, filed on Aug. 27, 2018, provisional application No. 62/647,933, filed on Mar. 26, 2018.

(51) Int. Cl.
| | |
|---|---|
| *G21G 1/00* | (2006.01) |
| *B01D 15/18* | (2006.01) |
| *B01D 15/36* | (2006.01) |
| *C01B 15/047* | (2006.01) |
| *C01F 17/13* | (2020.01) |
| *G21G 1/10* | (2006.01) |

(52) U.S. Cl.
CPC ......... *G21G 1/001* (2013.01); *B01D 15/1871* (2013.01); *B01D 15/362* (2013.01); *B01D 15/363* (2013.01); *C01B 15/0475* (2013.01); *C01F 17/13* (2020.01); *G21G 1/10* (2013.01); *G21G 2001/0089* (2013.01); *G21G 2001/0094* (2013.01)

(58) Field of Classification Search
CPC ................................. G21G 1/001; C01F 17/13
See application file for complete search history.

(56) References Cited

U.S. PATENT DOCUMENTS

| | | | |
|---|---|---|---|
| 2,815,264 A | 12/1957 | Calkins | |
| 4,923,985 A | 5/1990 | Gansow et al. | |
| 5,355,394 A | 10/1994 | van Geel et al. | |
| 5,854,968 A | 12/1998 | Horwitz et al. | |

| | | | |
|---|---|---|---|
| 6,309,614 B1 | 10/2001 | Horwitz et al. | |
| 6,670,456 B2 | 12/2003 | Frank et al. | |
| 6,680,993 B2 | 1/2004 | Satz et al. | |
| 6,683,162 B2 | 1/2004 | Scheinberg et al. | |
| 6,770,195 B2 | 8/2004 | Young et al. | |
| 6,787,042 B2 | 9/2004 | Bond et al. | |
| 6,808,557 B2 | 10/2004 | Holbrey et al. | |
| 6,852,296 B2 | 2/2005 | Bond et al. | |
| 6,998,052 B2 | 2/2006 | Horwitz et al. | |
| 7,087,206 B2 | 8/2006 | Bond et al. | |
| 7,091,338 B2 | 8/2006 | Bond et al. | |
| 7,157,022 B2 | 1/2007 | Horwitz et al. | |
| 7,553,461 B2 | 6/2009 | Horwitz et al. | |
| 7,569,192 B2 | 8/2009 | Tranter et al. | |
| 7,736,610 B2 | 6/2010 | Meikrantz et al. | |
| 7,794,691 B2 | 9/2010 | Morgenstern et al. | |
| 8,349,391 B2 | 1/2013 | Harfensteller et al. | |
| 9,058,908 B2 | 6/2015 | Zhuikov et al. | |
| 9,202,602 B2 | 12/2015 | Nolen, Jr. et al. | |
| 9,439,984 B2 | 9/2016 | Raymond et al. | |
| 9,534,277 B1 | 1/2017 | Moreno Bermudez et al. | |
| 9,555,140 B2 | 1/2017 | Birnbaum et al. | |
| 9,790,573 B2 | 10/2017 | Moreno Bermudez et al. | |
| 9,951,399 B2 | 4/2018 | Fassbender et al. | |
| 2001/0047185 A1 | 11/2001 | Satz | |
| 2002/0058007 A1 | 5/2002 | Scheinberg et al. | |
| 2002/0094056 A1 | 7/2002 | Satz et al. | |
| 2003/0023050 A1 | 1/2003 | Frank et al. | |
| 2003/0086868 A1 | 5/2003 | Ma et al. | |
| 2003/0175206 A1 | 9/2003 | Sgouros et al. | |
| 2004/0067924 A1 | 4/2004 | Frank et al. | |
| 2006/0072698 A1 | 4/2006 | Morgenstern et al. | |

(Continued)

FOREIGN PATENT DOCUMENTS

| | | |
|---|---|---|
| CA | 623879 A | 7/1961 |
| DE | 102006008023 B4 | 5/2008 |

(Continued)

OTHER PUBLICATIONS

Mastren et al., "Simultaneous Separation of Actinium and Radium Isotopes from a Proton Irradiated Thorium Matrix". Scientific Reports. 7:8216. Aug. 15, 2017.

(Continued)

*Primary Examiner* — Sikarl A Witherspoon

(74) *Attorney, Agent, or Firm* — Viridant IP

(57) ABSTRACT

A method of separating actinium and/or radium from proton-irradiated thorium metal. The thorium metal is irradiated to produce isotopes including thorium, actinium and/or radium. The resultant product is dissolved in solution and a selective precipitant is used to precipitate a bulk portion of the thorium. The precipitated thorium can be recovered. Chromatography is carried out on the remaining solution to remove residual thorium and to separate the actinium from the radium.

21 Claims, 16 Drawing Sheets

(56) References Cited

U.S. PATENT DOCUMENTS

| | | |
|---|---|---|
| 2006/0198772 A1 | 9/2006 | Abbas et al. |
| 2007/0076834 A1 | 4/2007 | Moreno Bermudez et al. |
| 2007/0153954 A1 | 7/2007 | Harfensteller et al. |
| 2009/0191122 A1 | 7/2009 | Moreno Bermudez et al. |
| 2011/0200154 A1 | 8/2011 | Nolen, Jr. et al. |
| 2011/0317795 A1 | 12/2011 | Zhuikov et al. |
| 2013/0266475 A1 | 10/2013 | Moreno Bermudez et al. |
| 2015/0098901 A1 | 4/2015 | Birnbaum et al. |
| 2015/0292061 A1 | 10/2015 | Fassbender et al. |
| 2015/0354026 A1 | 12/2015 | Kasaini |
| 2016/0111176 A1 | 4/2016 | Nolen, Jr. et al. |
| 2017/0009320 A1 | 1/2017 | Moreno Bermudez et al. |
| 2017/0112951 A1 | 4/2017 | Scheinberg et al. |
| 2017/0137916 A1 | 5/2017 | Moreno Bermudez et al. |
| 2017/0183365 A1 | 6/2017 | Butlin et al. |
| 2017/0202983 A1 | 7/2017 | Birnbaum et al. |

FOREIGN PATENT DOCUMENTS

| | | |
|---|---|---|
| RU | 2317607 C1 | 2/2008 |
| WO | 1993009816 A1 | 5/1993 |
| WO | 1999051299 A2 | 10/1999 |
| WO | 2006003123 A2 | 1/2006 |
| WO | 2012079582 A1 | 6/2012 |

OTHER PUBLICATIONS

Galley et al., "Inorganic Chemistry: Understanding the Scarcity of Thorium Peroxide Clusters". ACS Publications. Sep. 5, 2017.

Hasty et al., "Formation and Properties of Thorium Peroxide". Journal of the Less-Common Metals, 7 (1964) 447-452.

Hasty et al., "Isotopic exchange study on thorium peroxide". J. inorg. Nucl. Chem., 1971, vol. 33, pp. 874-876.

Hyde, "The Radiochemistry of Thorium". National Academy of Sciences—National Research Council. Jan. 1960.

Johnson et al., "Reactions of Aqueous Thorium Nitrate Solutions with Hydrogen Peroxide". J. Inor. Nucl. Chem. 1965, vol. 27, pp. 1787-1791.

Radchenko et al., "Application of ion exchange and extraction chromatography to the separation of actinium from proton-irradiated thorium metal for analytical purposes". J. Chromatogr. A, vol. 1380, pp. 55-63, Feb. 2015.

Abrao et al., "Preparation of highliy pure thorium nitrate via thorium sulfate and thorium peroxide". Journal of Alloys and Compounds 323-324 (2001) 53-56.

Tsoupko-Sitnikov et al. "Generator of actinium-225". Journal of Radioanalytical and Nuclear Chemistry, 1996, pp. 75-83.

Radchenko et al., "Radiometric evaluation of diglycolamide resins for the chromatographic separation of actinium from fission product lanthanides". Talanta, vol. 175, No. July, pp. 318-324, 2017.

Horwitz et al., "Novel Extraction of Chromatographic Resins Based on Tetralkyldiglycolamides: Characterization and Potential Applications". Solvent Extr. Ion Exch., vol. 23, pp. 319-344, 2005.

Galley et al., "Understanding the Scarcity of Thorium Peroxide Clusters". Inorg. Chem 56(21):12692-12694, 2017.

Henri Gauvin., "Thorium and protactinium are precipitated by HIO3 in concentrated nitric medium ". Journal de Physique, vol. 24, pp. 836-838, 1963.

Aliev, R. A .; Ermolaev, S. V.; Vasiliev, A. N.; Ostapenko, V. S.; Lapshina, E. V.; Zhuikov, B. L.; Zakharov, N. V.; Pozdeev, V. V.; Kokhanyuk, V. M.; Myasoedov, B. F.; Kalmykov, S. N. Isolation of Medicine-Applicable Actinium-225 from Thorium Targets Irradiated by Medium-Energy Protons. Solvent Extr. Ion Exch. 2014, 32, 468- 477.

Apostolidis, C.; Molinet, R.; Rasmussen, G.; Morgenstern, A. Production of Ac-225 from Th-229 for targeted alpha therapy. Anal. Chem. 2005, 77, 6288-6291.

Boll, R. A.; Malkemus, D.; Mirzadeh, S. Production of actinium 225 for alpha particle mediated radioimmunotherapy. Appl. Radiat. Isot. 2005, 62, 667-679.

Kotovskii, A. A.; Nerozin, N. A.; Prokof'ev, I. V.; Shapovalov, V. V.; Yakovshchits, Y. A.; Bolonkin, A. S.; Dunin, A. V. Isolation of actinium-225 for medical purposes. Radiochemistry 2015, 57, 285-291.

Engle, J. W.; Mashnik, S. G.; Weidner, J. W.; Wolfsberg, L. E.; Fassbender, M. E.; Jackman, K.; Couture, A.; Bitteker, L. J.; Ullmann, J. L.; Gulley, M. S.; Pillai, C.; John, K. D.; Birnbaum, E. R.; Nortier, F. M. Cross sections from proton irradiation of thorium at 800 MeV. Phys. Rev. C: Nucl. Phys. 2013, 88, 014604.

Ermolaev, S. V.; Zhuikov, B. L.; Kokhanyuk, V. M.; Matushko, V. L.; Kalmykov, S. N.; Aliev, R. A.; Tananaev, I. G.; Myasoedov, B. F. Production of actinium, thorium and radium isotopes from natural thorium irradiated with protons up to 141 MeV. Radiochim. Acta 2012, 100, 223-229.

Filosofov, D. V.; Rakhimov, A. V.; Bozhikov, G. A.; Karaivanov, D. V.; Lebedev, N. A.; Norseev, Y. V.; Sadikov, I. I. isolation of radionuclides from thorium targets irradiated with 300-MeV protons. Radiochemistry 2013, 55, 410-417.

Griswold, J.; Medvedev, D. G.; Engle, J. W.; Copping, R.; Fitzsimmons, J. M.; Radchenko, V.; Cooley, J. C.; Fassbender, M. E.; Owens, A. C.; Birnbaum, E. R.; John, K. D.; Nortier, F. M.; Stracener, D. W.; Heilbronn, L. H.; Mausner, L. F.; Mirzadeh, S. Large scale accelerator production of 225Ac: Effective cross sections for 78-192MeV protons incident on 232Th targets. Appl. Radiat. Isot. 2016, 118, 366-374.

NorthStar Medical Radioisotopes, Production of Actinium-225 via high Energy proton Induced Spallation of Thorium-232; 2011.

Weidner, J. W.; Mashnik, S. G.; John, K. D.; Ballard, B.; Birnbaum, E. R.; Bit- teker, L. J.; Couture, A.; Fassbender, M. E.; Goff, G. S.; Gritzo, R.; Hemez, F. M.; Runde, W.; Ullmann, J. L.; Wolfsberg, L. E.; Nortier, F. M. 225Ac and 223Ra pro-duction via 800 MeV proton irradiation of natural thorium targets. Appl. Radiat. Isot. 2012, 70, 2590-5.

Weidner, J. W.; Mashnik, S. G.; John, K. D.; Memez, F.; Ballard, B.; Bach, H.; Birnbaum, E. R.; Bitteker, L. J.; Couture, A.; Dry, D.; Fassbender, M. E.; Gulley, M. S.; Jackman, K. R.; Ullmann, J. L.; Wolfsberg, L. E.; Nortier, F. M. Proton-induced cross sections relevant to production of 225Ac and 223Ra in natural thorium targets below 200 MeV. Appl. Radiat. Isot. 2012, 70, 2602-2607.

Zhuikov, B. L.; Kalmykov, S. N.; Ermolaev, S. V.; Aliev, R. A.; Kokhanyuk, V. M.; Matushko, V. L.; Taranaev, I. G.; Myasoedov, B. F. Production of 225Ac and 223 Ra by irradiation of Th with accelerated protons. Radiochemistry 2011, 53, 73-80.

McAlister, D.; Perron, R.; Gendron, D.; Causey, P.; Philip Horwitz, E.; Harvey, J. T. Selective Separation of Radium and Actinium from Bulk Thorium Target Material. J. Med. Imaging Radiat. Sci. 2019, 50, S14-S15.

Third Party Submission of Information in respect of European Patent Application No. 19778195.8 submitted May 26, 2025.

Third Party Submission of Information in respect of Australian Patent Application No. 20250003 submited Jun. 5, 2025.

Third Party Submission of Information in respect of Canadian Patent Application No. 3095255 submitted Jun. 18, 2025.

'The Discovery of Actinium' by H.W. Kirby. Isis: A Journal of the History of Science Society, vol. 62, No. 3, pp. 290-308 Autum, 1971.

'Productionn and Separation of U233' by Glenn T. Seaborg and Leonard I. Katzin, United States Atomic Energy Comission (published in Technical Information Service Extension); Oak Ridge, Tenn; 1951.

'Standard Methods of Chemical Analysis' by Wilfred W. Scott, N. Howell Furman, Ed., published by D. Van Nostrand Company, Inc., New York; 1939.

300

320

322

ADJUST [HNO$_3$]

324

PASSING SOLUTION THROUGH STRONG CATION
EXCHANGE RESIN TO ADSORB Ac-227, Th-227 AND
Ra-223

326

ELUTE Ra-223

328

GENERATE ISOLATED Ra-223

330

ELUTE Ac-227 and Th-227

332

HOLD FRACTION CONTAINIG Ac-227 AND Th-227
FOR A DECAY PERIOD

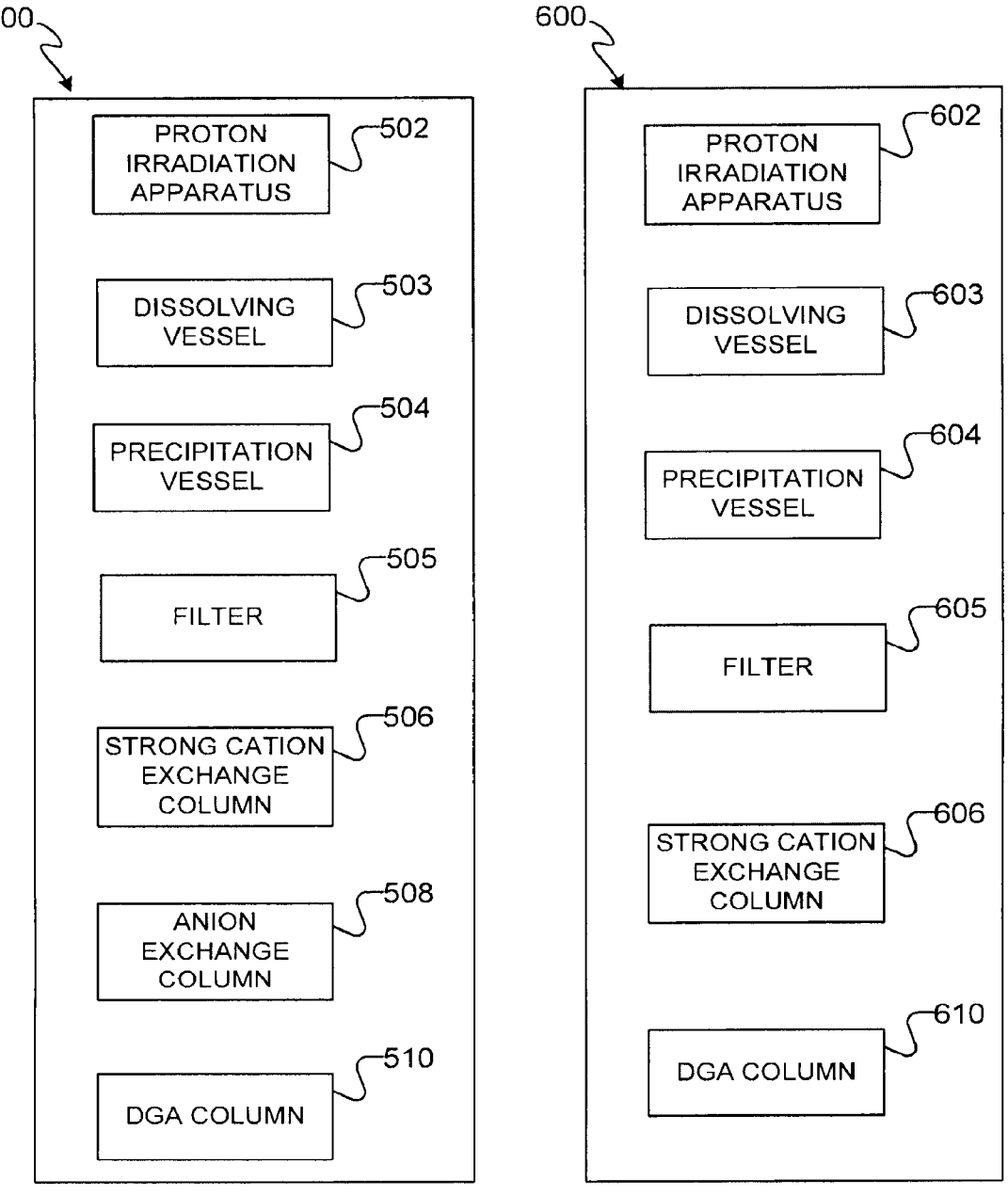
FIG. 10                    FIG. 11

| Expt. # | Th (g) | precipitant | temp. (C) | [HNO3] (M) | [precip] (M) | time (h) | Th (mg) | Ra (%) | Ac (%) | precipitate description |
|---|---|---|---|---|---|---|---|---|---|---|
| 1 | 0.7 | oxalic acid | 120 | 3.00 | 0.50 | 0.33 | nd | 87 | 74 | Thorium oxalate is a fine white precipitate. |
| ThOx-P1 | 0.31 | oxalic acid | 100 | 0.38 | 0.23 | 1.5 | nd | 97 | 52 | Precipitate formation decreases with |
| | 0.31 | oxalic acid | 100 | 2.69 | 0.23 | 1.5 | nd | 110 | 66 | increasing HNO3 concentration. |
| | 0.31 | oxalic acid | 100 | 5.77 | 0.23 | 1.5 | nd | 102 | 91 | Precipitate often still forms in filtrate. |
| | 0.31 | oxalic acid | 100 | 8.85 | 0.23 | 1.5 | nd | 102 | 88 | |
| ThOx-P2 | 0.39 | oxalic acid | 80 | 3.50 | 0.12 | 1.5 | - | - | - | no or little precepitate formation |
| | 0.39 | oxalic acid | 80 | 5.50 | 0.12 | 1.5 | - | - | - | |
| | 0.39 | oxalic acid | 80 | 7.50 | 0.12 | 1.5 | - | - | - | |
| | 0.39 | oxalic acid | 80 | 9.50 | 0.12 | 1.5 | - | - | - | (decreasing with higher [HNO3]) |
| | 0.39 | oxalic acid | 80 | 11.50 | 0.12 | 1.5 | - | - | - | |
| ThOx-P4 | 0.2 | oxalic acid | 80 | 3.50 | 0.12 | 1.5 | nd | 58.5 | 89 | no or little precipitation at higher [HNO3]. |
| | 0.2 | oxalic acid | 80 | 5.50 | 0.12 | 1.5 | nd | 77.5 | 99 | Fine precipitate hard to filter (passes |
| | 0.2 | oxalic acid | 80 | 7.50 | 0.12 | 1.5 | nd | 85.7 | 95 | through filter used) |
| | 0.2 | oxalic acid | 80 | 9.50 | 0.12 | 1.5 | nd | 103.8 | 104 | |
| | 0.2 | oxalic acid | 80 | 11.50 | 0.12 | 1.5 | nd | 106.7 | 97 | |
| ThIo-1 | 0.5 | iodic acid | 90 | 7.06 | 0.55 | 0.2 | nd | 80 | 83 | thick gelatinous white precipitate |
| ThIo-2 | 0.32 | iodic acid | 90 | 2.59 | 0.26 | 0.25 | - | - | - | white precipitate, too gelatinous to filter |
| ThPo-P1 | 0.04 | 30% H2O2 | RT | 0.72 | 4.36 | 0.75 | 0.14 | 95 | 97 | cloudy white gel |
| | 0.04 | 30% H2O2 | 80 | 0.72 | 4.36 | 0.25 | 0.53 | 91 | 98 | white floccy, finer, harder to filter |
| | 0.08 | 30% H2O2 | 80 | 1.23 | 0.55 | 1.8 | 4.80 | 104 | 92 | white floccy, coarser, harder to filter than |
| ThPo-P2 | 0.083 | 30% H2O2 | 80 | 3.77 | 0.55 | - | - | - | - | no preceipitate formation |
| | 0.083 | 30% H2O2 | 80 | 3.77 | 0.55 | - | - | - | - | no preceipitate formation |
| | 0.083 | 30% H2O2 | 80 | 3.77 | 0.55 | - | - | - | - | no preceipitate formation |
| | 0.083 | 30% H2O2 | 80 | 5.66 | 0.55 | - | - | - | - | no preceipitate formation |
| | 0.083 | 30% H2O2 | 80 | 7.55 | 0.55 | - | - | - | - | no preceipitate formation |
| ThPo-P3 | 0.67 | 30% H2O2 | RT | 0.007 | 3.133 | 3 | 1.49 | 82 | 78 | gelatinous, white |
| | 0.67 | 30% H2O2 | RT | 0.81 | 1.86 | 3 | 74.15 | 102 | 99 | coarse, chalky, easy to filter | precipitation conditions | filtrate contents/yield

FIG. 12

| Expt. # | precipitation conditions | | | | | | filtrate contents/yield | | | precipitate description |
|---|---|---|---|---|---|---|---|---|---|---|
| | Th (g) | precipitant | temp. (C) | [HNO3] (M) | [precip] (M) | time (h) | Th (mg) | Ra (%) | Ac (%) | |
| ThPo-P4 | 1 | 30% H2O2 | RT | 0.74 | 2.54 | 1.75 | 240.00 | 96 | 95 | coarse, chalky, easy to filter |
| | 1 | 30% H2O2 | RT | 0.37 | 2.54 | 2 | 13.00 | 85 | 89 | thicker and more gelatinous, harder to filter |
| | 1 | 30% H2O2 | RT | 0.56 | 2.54 | 2 | 52.08 | 89 | 90 | coarse, chalky, easy to filter |
| | 1 | 30% H2O2 | RT | 0.07 | 2.54 | 2 | 5.10 | 72.5 | 73 | thick, vol. gelatinous ppt, v. diff. to filter |
| | 1 | 30% H2O2 | RT | 0.74 | 2.54 | 2.25 | 108.90 | 95 | 95 | coarse, chalky, easy to filter |
| | 1 | 30% H2O2 | RT | 0.84 | 1.60 | 2.25 | 584.22 | 87 | 87 | coarse, chalky, easy to filter |
| | 1 | 30% H2O2 | RT | 0.74 | 2.54 | 2.25 | 140.95 | 98 | 99 | coarse, chalky, easy to filter |
| ThPo-P5 | 1 | 30% H2O2 | RT | 0.74 | 2.54 | 1.5 | 40.08 | 84.2 | 83.5 | coarse, chalky, easy to filter |
| | 1 | 30% H2O2 | RT | 0.74 | 2.54 | 2 | 104.07 | 99 | 99 | coarse, chalky, easy to filter |
| | 1 | 30% H2O2 | RT | 0.74 | 2.54 | 2.5 | 46.56 | 92 | 97 | coarse, chalky, easy to filter |
| ThPo-P7 | 1 | 30% H2O2 | RT | 0.59 | 4.04 | 2 | 61.00 | 83 | 86 | coarse, chalky, easy to filter |
| | 1 | 30% H2O2 | RT | 0.59 | 4.04 | 2 | 60.00 | 93 | 97 | coarse, chalky, easy to filter |
| | 1 | 30% H2O2 | RT | 0.42 | 5.72 | 2 | - | - | - | gelatinous, too hard to filter |

FIG. 12 cont.

SYSTEMS, APPARATUS AND METHODS FOR SEPARATING ACTINIUM, RADIUM, AND THORIUM

REFERENCE TO RELATED APPLICATIONS

This application is a divisional of U.S. application Ser. No. 17/040,652, which is a 371 national phase entry of PCT application No. PCT/CA2019/050370 filed 26 Mar. 2019, which claims priority to, and the benefit of, U.S. provisional patent application No. 62/647,933 filed 26 Mar. 2018, and U.S. provisional patent application No. 62/723,112 filed 27 Aug. 2018. All of the foregoing applications are incorporated by reference herein for all purposes in their entireties.

TECHNICAL FIELD

Some embodiments of the present invention relate to methods for the separation or purification of actinium and radium from thorium. Some embodiments of the present invention relate to methods for the recovery of thorium from a solution that also contains actinium and radium. Some embodiments of the present invention relate to apparatus for the separation or purification of actinium and radium from thorium. Some embodiments of the present invention relate to apparatus for recovering thorium from a solution that also contains actinium and radium.

BACKGROUND

Radionuclides such as radium-225 (Ra-225), radium-223 (Ra-223), actinium-225 (Ac-225), and bismuth-213 (Bi-213) (a daughter radionuclide of Ac-225) are important therapeutic agents. Such radionuclides emit alpha particles during their radioactive decay, and are potentially useful for treating tumors, cancers, and the like. In some aspects, such radionuclides can be coupled to various antibodies for use in the treatment of cancer, for example to cause selective killing of cancer cells using alpha radiation, i.e. radioimmunotherapy. In some aspects, appropriate chelating agents are used to couple such radionuclides to antibodies for the treatment of cancer.

Some radionuclides such as radium (including Ra-223, Ra-224 and Ra-225) and actinium (including Ac-225, Ac-227 and Ac-228) can be produced by the irradiation of thorium metal with a proton beam. Irradiation of thorium metal including Th-232 can yield over 700 different isotopes of potential interest, including Ra-224 and the Ra-224 decay products Pb-212 and Bi-212. Ra-225 decays to Ac-225, which in turn can decay to Bi-213. Other radionuclides of potential interest include Th-229, Th-228, Th-227, Ra-226, Ra-223, Rn-222, Pb-210, and the like. Ac-227 is also of interest as a generator for both Th-227 and Ra-223. The desired radionuclides can be recovered subsequent to proton irradiation by dissolving the irradiated thorium in an acidic solution, and various chromatography techniques can be used to effect a separation of the desired actinium and radium products from the thorium starting material and other spallation products.

In addition to the production of actinium and radium via the irradiation of thorium metal, undesirable radioisotopes can be formed. For example, radioactive isotopes of lower lanthanide elements (e.g. lanthanum and cerium) are not desirable in preparations of radioisotopes intended for use in medical applications. Thus, such undesirable radioactive isotopes should be removed.

The foregoing examples of the related art and limitations related thereto are intended to be illustrative and not exclusive. There remains a need for improved methods of separating desired radionuclides such as actinium, radium and thorium from each other and from other metals. There remains a need for improved processes for the preparation and purification of desirable radioisotopes including thorium, actinium and radium. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention relates to a method of separating thorium from actinium and/or radium. The method includes the steps of placing the thorium and the actinium and/or radium in a weak acid solution; adding a selective precipitant to the weak acid solution and precipitating a bulk portion of the dissolved thorium under precipitation conditions while leaving the actinium and/or radium in the solution and filtering to separate the precipitated bulk portion of the thorium from the actinium and/or radium in the solution.

Another aspect of the invention relates to a method of separating actinium or radium from thorium. The method optionally includes the step of irradiating thorium metal to produce actinium and/or radium. The method comprises placing thorium and actinium and/or radium in a weak acid to yield a first solution comprising dissolved thorium and the actinium and/or radium; adding a selective precipitant and precipitating a bulk portion of the dissolved thorium under precipitation conditions while retaining the actinium and/or radium and a residual portion of the thorium in a second solution; adding a selective precipitant and precipitating a bulk portion of the dissolved thorium under precipitation conditions while retaining the actinium and/or radium and a residual portion of the thorium in a second solution; and conducting chromatographic purification of the second solution to separate the actinium and/or radium from the residual thorium.

Another aspect of the invention relates to a method of producing thorium radioisotopes. The method includes the steps of irradiating thorium metal to produce thorium radioisotopes; placing the irradiated thorium metal in a weak acid to yield a first solution comprising dissolved thorium; adding a selective precipitant and precipitating a bulk portion of the dissolved thorium under precipitation conditions while leaving a residual portion of the dissolved thorium in a second solution; and filtering to separate the precipitated thorium product from the second solution.

In some embodiments, the selective precipitant comprises hydrogen peroxide, oxalic acid or iodic acid.

In some embodiments, the weak acid comprises nitric acid.

In some embodiments, the actinium comprises Ac-225 or Ac-227. In some aspects, the thorium comprises Th-228. In some aspects, the radium comprises Ra-225.

Another aspect of the invention relates to an apparatus for separating actinium and/or radium from thorium. The apparatus has a vessel for dissolving irradiated thorium metal, including the actinium and/or radium, in a mild acid solution; a vessel for selectively precipitating a bulk portion of the thorium via addition of a selective precipitant; and a filter for separating the precipitated bulk portion of the thorium from the mild acid solution containing the actinium and/or radium and the residual portion of the thorium.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 10 shows schematically an example apparatus for producing and recovering radium and actinium from thorium metal.

FIG. 11 shows schematically an alternative example apparatus for producing and recovering radium and actinium from thorium metal.

FIG. 12 shows the results of experiments conducted to evaluate conditions under which thorium metal can be precipitated while avoiding co-precipitation of actinium and radium.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As used in this specification, the term actinium includes isotopes of actinium including Ac-225, Ac-227 and Ac-228. Ac-225 has a half-life of 10 days; Ac-227 has a half-life of 21.8 years, and Ac-228 has a half-life of 6 hours.

As used in this specification, the term thorium includes isotopes of thorium including Th-232 (half-life of $1.405 \times 10^{10}$ years), Th-229 (half-life of 7917 years), Th-228 (half-life of 1.9 years), and Th-227 (half-life of 18.7 days).

As used in this specification, the term radium incudes isotopes of radium including Ra-223 (half-life of 11.4 days), Ra-224 (half-life of 3.6 days) and Ra-225 (half-life of 14.8 days).

The inventors have now developed an improved process for the separation of actinium (Ac) and radium (Ra) isotopes from thorium (Th). The inventors have now identified reaction conditions that can be used to selectively precipitate thorium metal ions without co-precipitating radium and actinium metal ions. In one aspect, after the irradiation of thorium metal to produce thorium, actinium and radium isotopes, a selective precipitation is carried out to precipitate a bulk portion of the irradiated thorium metal, while leaving actinium, radium, and a residual portion of the irradiated thorium metal in solution. Thorium, e.g. as Th-232 but also containing Th-228 and Th-227, can be recovered from the precipitate. Actinium, e.g. as Ac-225 or Ac-227, and radium, e.g. as Ra-223, Ra-224 or Ra-225, can be recovered from the resulting solution using chromatography. Precipitation of a bulk amount of the thorium prior to chromatographic purification of the resulting solution minimizes the column and solution volumes required to separate actinium and radium from the residual thorium and other undesired solution components remaining after precipitation.

Figure 1:
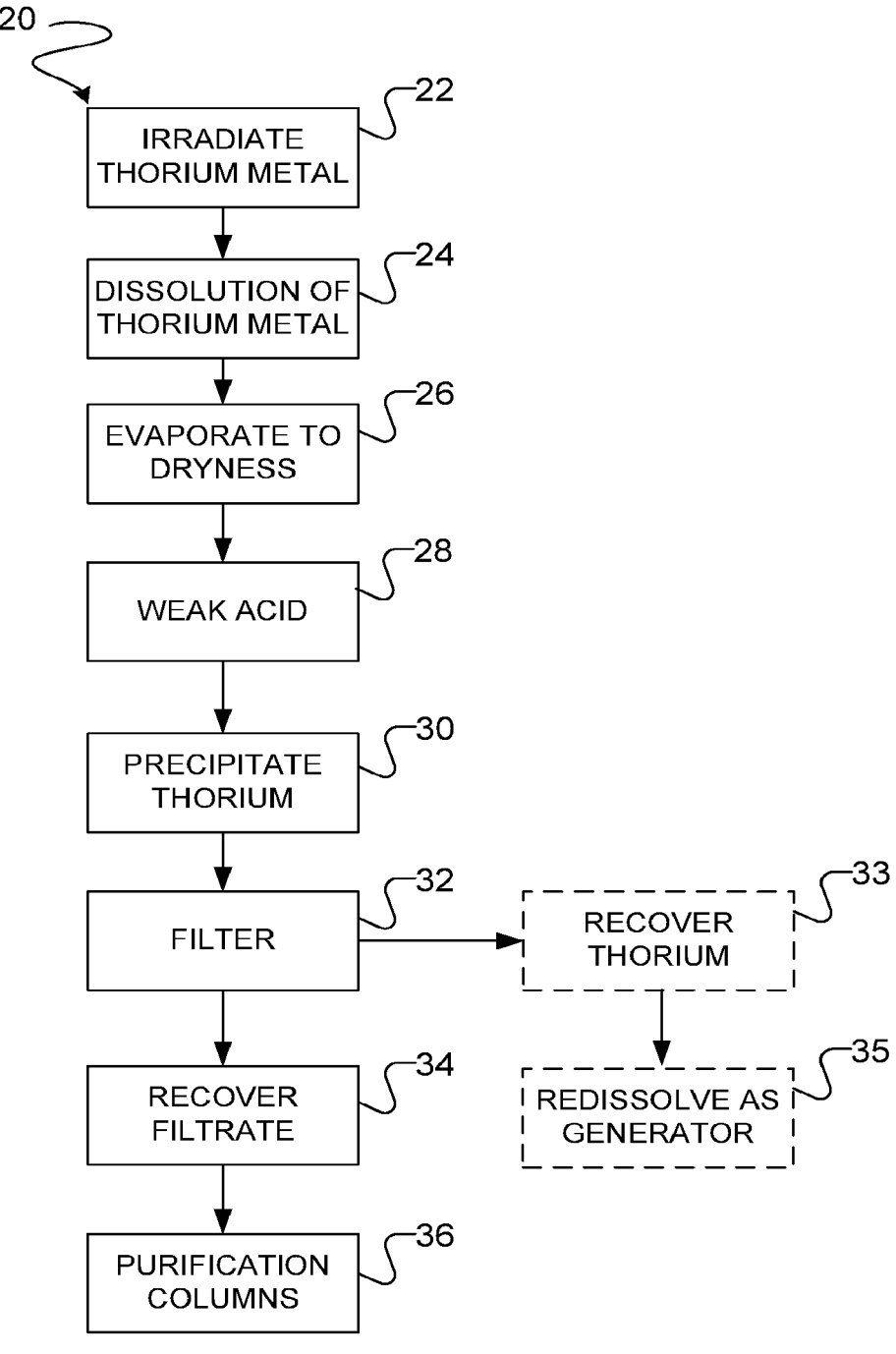
FIG. 1 shows an example embodiment of a process for producing and recovering radium, actinium and thorium isotopes from irradiated thorium metal.
Figure 2:
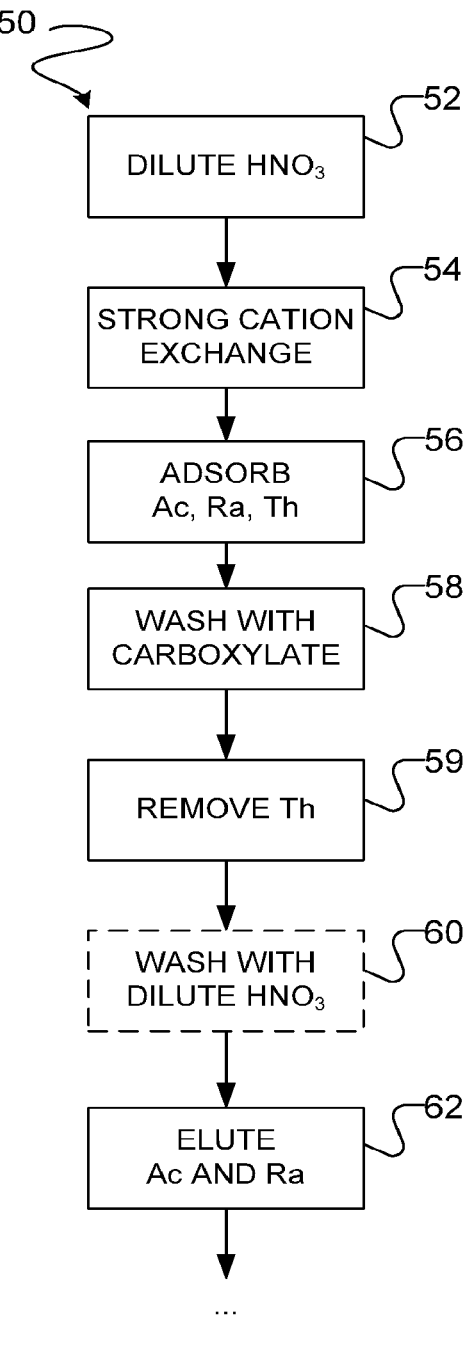
FIGS. 2 and 3 show an example embodiment of a plurality of separation columns that can be used in a process of separating radium and actinium from thorium.
Figure 3:
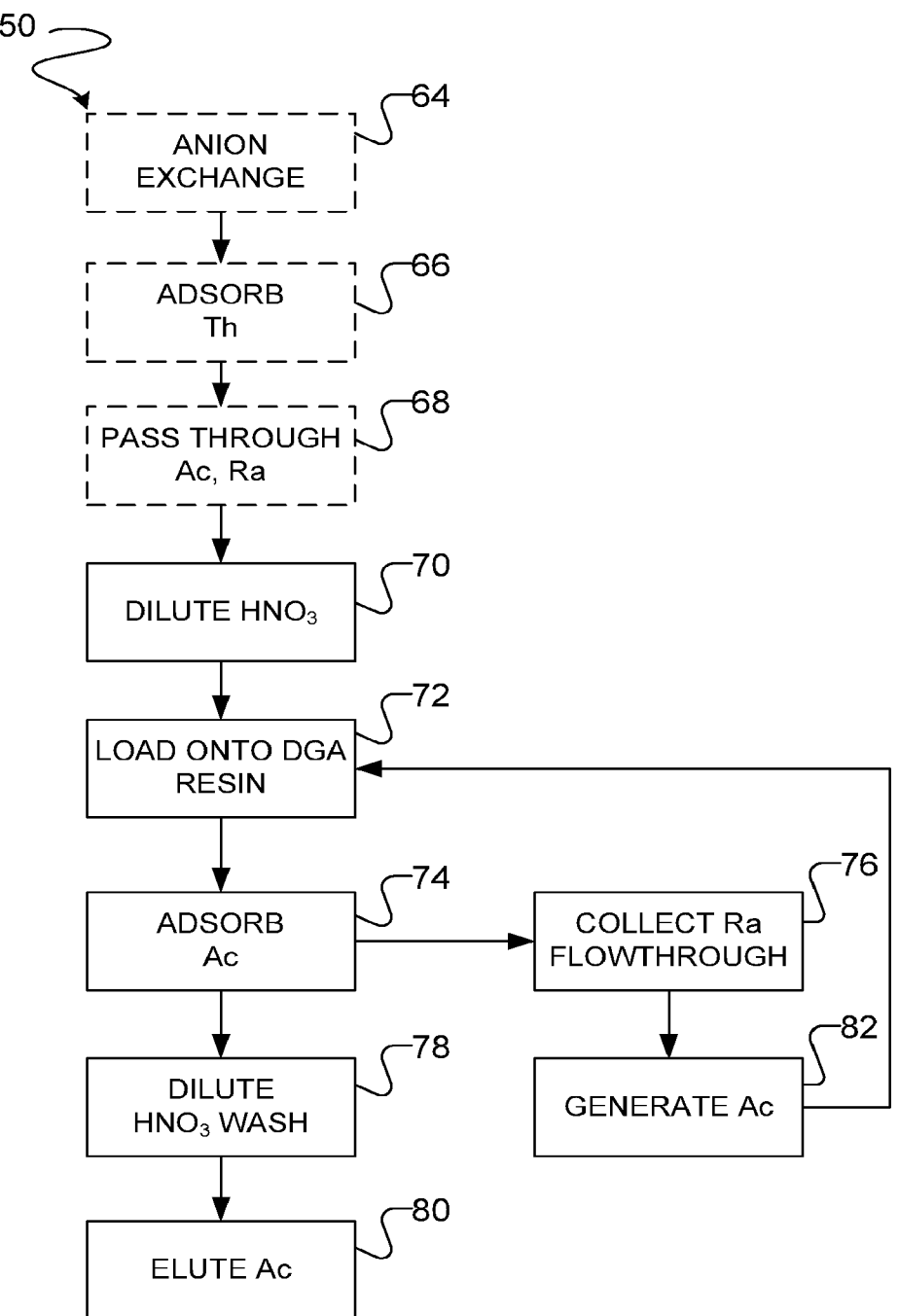

In one example embodiment of a method 20, 50 illustrated in FIGS. 1-3, at step 22 actinium and radium are generated by proton-irradiation of thorium metal (e.g. Th-232). In one example embodiment, the thorium metal is irradiated with high energy protons, e.g. protons having an energy of 50 MeV or higher, e.g. 60, 70, 80, 90, 100, 120, 150, 200, 250, 300, 350, 400, 450 or 500 MeV at step 22. In one example embodiment, the protons have an energy of at least 200 MeV. In one example embodiment, the protons have an energy of approximately 480 MeV. In one example embodiment, the high energy protons are created by a cyclotron at step 22.

Prior to irradiation at step 22, the thorium starting material is naturally enriched as Th-232. Irradiation by the proton beam produces other radioisotopes of thorium including Th-228 and Th-227, while the Th-232 is present both before and after proton irradiation. The relative amount of different radionuclides produced during thorium irradiation depends on factors including the proton energy and the irradiation duration. In one example embodiment, e.g. where Ac-225 is a desired radionuclide product, proton irradiation is carried out at a level of 100 uA of protons for 10 days, resulting in one example in conversion of $3 \times 10^{-5}$ of the thorium atoms present being converted to a different element or isotope (e.g. conversion of about 0.3 mg of a 10 g thorium target is achieved, with about less than 1 mg of actinium and about less than 1 mg of radium being produced). In some example embodiments, irradiation by the proton beam produces other radioisotopes of thorium including Th-228 and Th-227 in below microgram quantities, while the Th-232 is present both before and after proton irradiation in gram quantities.

Next, at step 24, the irradiated thorium metal is dissolved in any suitable mineral acid, e.g. nitric acid ($HNO_3$), hydrochloric acid (HCl), hydrobromic acid (HBr), or the like, with the addition of a small amount of fluoride ($F^-$, e.g. in the form of hydrofluoric acid (HF)) or hexafluorosilicate ($F_6Si_2^{-2}$). In some embodiments, the mineral acid solution used at step 24 to dissolve the irradiated thorium metal is a concentrated mineral acid solution, for example having a concentration of between 8 M and 12 M, including any value therebetween e.g. 9, 10 or 11 M.

At step 26, the solution is evaporated to dryness, and at step 28, the dried salts are redissolved in a weak acid solution, e.g. having a concentration of less than 5 M, e.g. 4 M, 3.75 M, 3.5 M, 3.25 M, 3 M, 2.75 M, 2.5 M, 2.25 M, 2.0 M, 1.75 M, 1.50 M, 1.25 M, 1.0 M, 0.75 M, 0.6 M, 0.5 M, 0.4 M, 0.3 M, 0.2 M, 0.1 M, 0.075 M, 0.05 M, 0.025 M, 0.010 M, 0.0075 M, 0.005 M, 0.0025 M, 0.001 M, or the like. In some embodiments, the weak acid solution used to redissolve the dried salts at step 28 has a concentration of between 0.1 and 1.0 M, or between 0.25 and 1.0 M, or between 0.5 to 0.75 M.

In some embodiments, steps 24 and 26 are omitted and irradiated thorium metal is dissolved directly in a weak acid to yield a solution comprising thorium, actinium and radium. In some embodiments, the thorium, actinium and radium are obtained from any suitable source and are placed in a weak acid solution having the desired acid concentration (e.g. by adjusting the concentration of the weak acid) at step 28 to start the method of separating the thorium, actinium and radium.

In one example embodiment, the volume of weak acid solution that is used to redissolve the dried salts at step 28 is at least 5 mL of acid per gram of thorium metal that was irradiated at step 22. In alternative embodiments, the volume of weak acid solution that is used to redissolve the dried salts at step 28 is at least 6, 7, 8, 9, 10, 11, 12, 13, 14 or 15 mL of acid per gram of thorium metal that was irradiated at step 22. In alternative embodiments, any desired concentration of weak acid solution is used at step 28 to redissolve the dried salts, and then the concentration of weak acid is adjusted to a desired level prior to addition of a precipitant at step 30.

In some embodiments, the weak acid used to redissolve the dried salts at step 28 is a mineral acid such as hydrochloric acid, hydrobromic acid, nitric acid, or the like. In some embodiments, the weak acid used to redissolve the dried salts at step 28 is nitric acid ($HNO_3$).

At step 30, a bulk portion of the thorium is precipitated by the addition of a selective precipitant under precipitation conditions. In some embodiments, the selective precipitant is hydrogen peroxide ($H_2O_2$) or oxalic acid ($C_2H_2O_4$). In alternative embodiments, the selective precipitant is iodic acid ($HIO_3$). Hydrogen peroxide reacts with thorium ions to form insoluble thorium peroxide. Oxalic acid reacts with thorium ions to form insoluble thorium oxalate. Iodic acid reacts with thorium ions to form insoluble thorium iodate. As used herein, the term "selective precipitant" refers to any precipitant now known or developed in future that precipitates thorium but not radium or actinium in a weak acid solution, including in a weak mineral acid solution, and including in a weak nitric acid solution. In alternative embodiments, other conditions and precipitants now known or determined in future to selectively precipitate thorium but not actinium or radium could be used at step 30 to produce suitable precipitation conditions to allow for the selective precipitation of a bulk portion of the thorium in solution while leaving most of the actinium and radium in the solution (i.e. without appreciable co-precipitation of actinium or radium).

In some embodiments, at step 30 a bulk portion of the thorium is precipitated by the addition of the selective precipitant. As used herein, the term "bulk portion" refers to a significant proportion, e.g. >60%, >70%, >75%, >80%, >85%, >90%, >92%, >94%, >95%, >96%, >97%, >98% or >99%, of the thorium initially present in solution. The remainder of the thorium that is not precipitated remains in solution as residual thorium.

In some embodiments, the amount of selective precipitant added at step 30 is a molar excess relative to the amount of thorium metal that was subjected to proton irradiation at step 22. In some embodiments, the amount of selective precipitant added at step 30 is at least a 1.05-fold molar excess or more, e.g. at least a 1.10-, 1.15-, 1.20-, 1.25-, 1.30-, 1.40-, 1.50-, 1.60-, 1.70-, 1.80-, 1.90-, 2.0-, 2.1-, 2.2-, 2.3-, 2.4-, 2.5-, 3-, 3.5-, 4-, 4.5-, or 5-fold or more molar excess relative to the amount of thorium metal that was subjected to proton irradiation at step 22. In some embodiments, the concentration of the selective precipitant added at step 30 is sufficient to yield precipitation conditions wherein the concentration of the selective precipitant is initially at least 0.05 M, e.g. at least 0.10, 0.20, 0.30, 0.40, 0.50, 0.60, 0.70, 0.80, 0.90, 1.00, 1.25, 1.50, 1.75, 2.0, 2.25, 2.50, 2.75, 3.0, 3.25, 3.50, 3.75, 4.00, 4.25, 4.50, 4.75, 5.00, 5.5 or 6.0 M, including any subrange therebetween. In some embodiments, the concentration of the selective precipitant added at step 30 is initially between 0.01 and 4.0 M, or between 0.05 and 2.5 M. The selective precipitant used at step 30 selectively precipitates thorium over actinium and radium isotopes. Thus, at step 30, a bulk amount of the thorium metal is precipitated, while the actinium and radium isotopes (or at least a significant proportion of the actinium and radium isotopes) remain in solution.

In some embodiments, the volume of selective precipitant and the volume of the solution obtained from step 28 are selected to yield a final weak acid concentration (e.g. a mineral acid, e.g. nitric acid, hydrochloric acid, hydrobromic acid, or the like) in the solution in which the thorium is precipitated at step 30 of less than 5 M, e.g. 4 M, 3.75 M, 3.5 M, 3.25 M, 3M, 2.75 M, 2.5 M, 2.25 M, 2.0 M, 1.75 M, 1.50 M, 1.25 M, 1.0 M, 0.75 M, 0.6 M, 0.5 M, 0.4 M, 0.3 M, 0.2 M, 0.1 M, 0.075 M, 0.05 M, 0.025 M, 0.010 M, 0.0075 M, 0.005 M, 0.0025 M, 0.001 M, or the like. In some embodiments, the solution in which the thorium is precipitated has (i.e. the precipitation conditions comprise) a weak acid concentration, e.g. a nitric acid concentration, of between 0.005 and 4M, or between 0.1 to 3.5 M, or between 0.1 and 1.0 M, or between 0.25 and 1.0 M, or between 0.5 to 0.75 M, or between 0.55 to 0.75 M, or between 0.60 and 0.70 M.

In some embodiments, the precipitation at step 30 is conducted at a temperature between 10° C. and 130° C., including any temperature therebetween, e.g. 20° C., 30° C., 40° C., 50° C., 60° C., 70° C., 80° C., 90° C., 100° C. or 120° C. In some embodiments, the precipitation at step 30 is conducted at ambient temperature, e.g. a temperature in the range of 15° C. to 30° C., including any value therebetween e.g. 16° C., 18° C., 20° C., 22° C., 24° C., 26° C. or 28° C.

The precipitation at step 30 is conducted for a sufficient period of time to allow a bulk portion of the thorium to form a precipitate with the selective precipitant. In some embodiments, the precipitation at step 30 is conducted for a time period of between 0.1 and 5 hours, including any time period therebetween, e.g. 0.2, 0.3, 0.4, 0.5, 0.75, 1.0, 1.25, 1.5, 1.75, 2.0, 2.5, 3.0, 3.5, 4.0 or 4.5 hours.

In some embodiments, the precipitation of thorium at step 30 results in the removal of a significant proportion, i.e. a bulk portion, of the thorium metal present in solution after step 28 to facilitate subsequent purification of actinium and radium from residual thorium metal that remains in solution after step 30 via cation exchange chromatography. If a bulk portion of the thorium were not removed by precipitation at step 30, then the solution would contain a very high concentration of thorium ions and would potentially overwhelm the capacity of the cation exchange column to adsorb the thorium, actinium and radium, thereby preventing their separation via cation exchange chromatography. Consequently, removal of a bulk amount of the thorium metal via a precipitation step carried out prior to chromatographic separation is believed to allow for the use of smaller column and elution volumes than would otherwise be possible if precipitation of thorium at step 30 was not carried out.

At step 32, the precipitated thorium, e.g. present as thorium peroxide, thorium oxalate or thorium iodide, is filtered from the remaining solution containing actinium, radium, residual thorium, and any other spallation products that were not co-precipitated. At step 33, the precipitate containing thorium is optionally recovered from the filtration step. In some embodiments, recovering thorium from the precipitate comprises at step 35 redissolving the precipitated thorium after filtration to yield a generator solution containing thorium, e.g. as Th-228 radionuclides. This generator solution can be used as a Th-228/Ra-224/Pb-212/Bi-212 generator. In some embodiments, at step 35, the precipitated thorium is redissolved in a strong acid, e.g. nitric acid having a concentration of at least 8 M, including e.g. 9, 10, 11, 12 M or more. Thus, in some embodiments, a method of recovering thorium radionuclides from a solution containing thorium and actinium or radium by carrying out steps 28, 30, 32 and 33 is provided. In some such embodiments, step 28 comprises adjusting a concentration of weak acid in an existing solution containing thorium and radium or actinium rather than dissolving salts of such metals.

At step 34, the filtrate is recovered from the filtration process of step 32. The filtrate recovered at step 34 contains actinium, radium, residual thorium, and any other spallation products that were not co-precipitated.

At step 36, the actinium and radium isotopes contained in the filtrate can be separated from the residual thorium and other spallation products that remain in the filtrate using any suitable chromatography method. In one example embodiment, a combination of ion exchange and extraction chromatography resins (also referred to as columns) is used to separate actinium and radium from residual thorium.

An example embodiment of a combination of ion exchange and extraction chromatography resins or columns that can be used to separate the actinium and radium isotopes contained in the filtrate from residual thorium and other spallation products is shown in FIGS. 2 and 3.

As shown in FIG. 2, a method of ion exchange chromatography 50 can be carried out using a suitable strong cation exchange resin such as a resin having a sulfonic acid functional group, e.g. BIORAD™ AG50W, BIORAD™ AG50WX4 or AG502X8 H⁺ form, BIORAD™ AG MP-50 macroporous resin, DOWEX™ 50WX8, or the like. In some embodiments, the strong cation exchange resin is Dowex™ 50WX8. At step 52, the filtrate recovered after thorium precipitation is diluted so that the acid content of the solution is relatively weak (e.g. less than about 0.5 M nitric acid in some embodiments, or less than about 0.4 M, 0.3 M. 0.2 M or 0.1 M in some embodiments).

At step 54, the diluted filtrate from step 52 is passed through the strong cation exchange column. In some embodiments, at step 54, the diluted filtrate from step 52 is passed through the strong cation exchange column prior to the addition of any ligand suitable for forming an anionic complex with thorium such as citrate, i.e. the loading of the diluted filtrate from step 52 is carried out substantially in the absence of a ligand suitable for forming an anionic complex with thorium, e.g. citrate. In some embodiments, the amount of strong cation exchange resin used is approximately 1 mL of strong cation exchange resin per gram of thorium metal that is initially irradiated, including e.g. about 1.5, 1.25 or 0.75 mL of strong cation exchange resin per gram of thorium metal that is initially irradiated. As the filtrate passes through the strong cation exchange column, at step 56 actinium, radium and residual thorium are all adsorbed onto the strong cation exchange resin.

At step 58, in some embodiments the column is washed with a ligand suitable for forming an anionic complex with the adsorbed thorium, for example a suitable di-, tri- or tetra-carboxylate or its corresponding carboxylic acid, e.g. citrate, tartrate, ethylenediamenetetraacetate (EDTA), oxalate, malonate, or the like. In one example embodiment, the column is washed with citrate at step 58.

At step 58, the column is washed with a sufficient volume of the ligand suitable for forming an anionic complex with the adsorbed thorium to flush compounds that are not adsorbed by the strong cation exchange resin from the column. For example, in some embodiments, the column is washed with between 5 and 50 column volumes of solution containing the ligand, including any value therebetween e.g. 10, 15, 20, 25, 30, 35, 40 or 45 column volumes. In some embodiments, the column is washed with citric acid having a concentration of between 0.1 and 1.5 M, including any value therebetween e.g. 0.2, 0.3, 0.4, 0.5, 0.6, 0.7, 0.8, 0.9, 1.0, 1.1, 1.2, 1.3 or 1.4 M and a pH between 1.8 and 2.5, including any value therebetween, e.g. 1.9, 2.0, 2.1, 2.2, 2.3 or 2.4.

The citric acid forms an anionic complex with thorium, so that thorium is washed through the strong cation exchange column at step 59. Without being bound by theory, it is believed that addition of citrate only after thorium has been adsorbed by the strong cation exchange column (rather than adding citrate prior to loading the strong cation exchange column) allows for the use of a smaller volume of solution than would otherwise be required if citrate was added to the solution prior to loading the actinium and radium on the strong cation exchange column.

In some embodiments, including the illustrated embodiment, to remove citric acid, at step 60, the strong cation exchange column is washed with a weak solution of nitric acid, e.g. having a concentration of less than about 1 M, including e.g. 0.9 M, 0.8 M, 0.7 M, 0.6 M, 0.5 M, 0.4 M, 0.3 M, 0.2 M or 0.1 M. In some embodiments, the strong cation exchange column is washed with at least two column volumes of weak nitric acid at step 60, including e.g. at least 3, 4, 5, 6, 7, 8, 9 or 10 column volumes.

In alternative embodiments, step 60 can be omitted if it is determined that the presence of citric acid does not interfere with the subsequent DGA separation chromatography step. In alternative embodiments, step 60 is omitted and is replaced by a different method of removing citric acid from the eluate subsequent to completion of elution step 62, for example by subjecting the eluate obtained at step 60 to evaporation or wet ashing (to decompose citrate) prior to redissolution in nitric acid having a concentration of between 2 M and 8 M, e.g. 4M, for carrying out of DGA chromatography at step 72.

At step 62, actinium and radium are eluted from the strong cation exchange column using a moderate concentration of nitric acid, e.g. between about 2 M and 16 M, including any value therebetween, e.g. about 3, 4, 5, 6, 7, 8, 9, 10, 11, 12, 13, 14 or 15 M. In one example embodiment, the strong cation exchange column is washed with nitric acid having a concentration of approximately 8 M at step 62. The volume of the nitric acid used at step 62 to wash the strong cation exchange column will vary depending on the concentration of nitric acid used, but a volume of about 6 column volumes, including e.g. 4, 5, 7 or 8 column volumes, is used in one example embodiment in which the nitric acid has a concentration of 8 M.

With reference to FIG. 3, at step 64, as denoted with dashed lines for optional steps, in some but not all embodiments the eluate from step 62 is passed through a column containing an anion exchange resin. Examples of suitable anion exchange resins that can be used in various embodiments at step 64 include strongly basic ion exchange resins having quaternary amino groups such as Dowex™ 1×8 anion exchange resin.

At step 66, thorium and some other spallation products such as protactinium (which may be produced in significant quantities) are adsorbed onto the anion exchange resin. At step 68, actinium and radium pass through the anion exchange column. The concentration of nitric acid used at steps 64, 66 and 68 is selected so that residual thorium will be adsorbed onto the anion exchange resin while the actinium and radium pass through the column. In example embodiments, the concentration of nitric acid used at steps 64, 66 and 68 is between about 8 to 10 M, including any value therebetween e.g. 8.2, 8.4, 8.6, 8.8, 9.0, 9.2, 9.4, 9.6 or 9.8 M.

At step 70, the eluate from step 68 (or from step 62 in embodiments in which no anion exchange separation is carried out and steps 64, 66 and 68 are omitted) is diluted so that the concentration of nitric acid is in the range of about 2 M to about 8 M, including any value therebetween e.g. 2.5, 3.0, 3.5, 4.0, 4.5, 5.0, 5.5, 6.0, 6.5, 7.0 or 7.5 M. In one example embodiment, the eluate from step 68 is diluted so that the concentration of nitric acid is approximately 4 M.

At step 72, extraction chromatography is carried out. The diluted solution from step 70 is loaded onto a column containing a DGA resin such as a DGA-branched (TEHDGA) (N,N,N',N'-tetrakis-2-ethylhexyl-diglycol-amide) or DGA-normal (TODGA) resin (N,N,N',N'-tetra-n-octyldiglycolamide). At the concentration of nitric acid produced by step 70, actinium will be adsorbed by the DGA resin at step 74 while radium will flow through the DGA resin and be collected at step 76.

At step 78, the DGA column is washed with dilute nitric acid, e.g. having a concentration in the range of about 2 M to about 8 M, including any value therebetween e.g. 2.5, 3.0, 3.5, 4.0, 4.5, 5.0, 5.5, 6.0, 6.5, 7.0 or 7.5 M. In one example embodiment, the DGA column is washed with nitric acid having a concentration of approximately 4 M.

At step 80, the bound actinium is eluted from the DGA column using concentrated nitric acid, e.g. having a concentration of greater than about 10 M, including e.g. 10.5 M, 11.0 M, 11.5 M, 12.0 M, 12.5 M or higher.

In some embodiments, the actinium eluted from the DGA column at step 80 is Ac-225. In some embodiments, the Ac-225 can be used in any desired medical application, e.g.

radioimmunotherapy. In some embodiments, the Ac-225 can be used as a generator of the medical isotope Bi-213.

In some embodiments, the actinium eluted from the DGA column at step 80 is Ac-227. In some embodiments in which the desired product is Ac-227, at step 22, the thorium metal is irradiated for a longer period than in embodiments in which the desired actinium product is Ac-225. In some embodiments in which the desired product is Ac-227, a decay period may be included as described below to allow the irradiated thorium target to decay prior to dissolution at step 24 and proceeding with the remaining steps in method 20, allowing for the decay of shorter-lived actinium isotopes than Ac-227. In some embodiments, the Ac-227 product so isolated can be used as a generator of Th-227, which itself acts as a generator of Ra-223. In some embodiments in which the desired product is Ac-227, the waiting period for the desired daughter radionuclide to grow in is longer than embodiments in which the desired product is Ac-225, as Ac-227 has a longer half-life (21.8 years) than Ac-225 (10 days).

At step 76, the collected solution containing radium in dilute nitric acid (e.g. about 4 M nitric acid in one example embodiment) may be retained and used to generate additional actinium isotopes at step 82. In one example embodiment, the collected radium is Ra-225 and a further Ac-225 product is harvested from the collected Ra-225 after a suitable period of time to allow Ac-225 to grow into the retained solution. For example, after about 2, 3, 4, 5, 6, 7, 8, 9, 10, 11, 12, 13, 14, 15, 16, 17, 17.5, 18, 19, 20 or more days, the resulting solution can again be loaded onto a DGA column and steps 72, 74, 78 and 80 repeated to yield a second round of the desired Ac-225 product. While a maximal yield of Ac-225 that can be obtained in a single elution from an Ra-225 generator results from eluting approximately every 17.5 days, useable quantities of Ac-225 can be obtained by repeated elution after shorter intervals as long as a couple of days.

Figure 4:
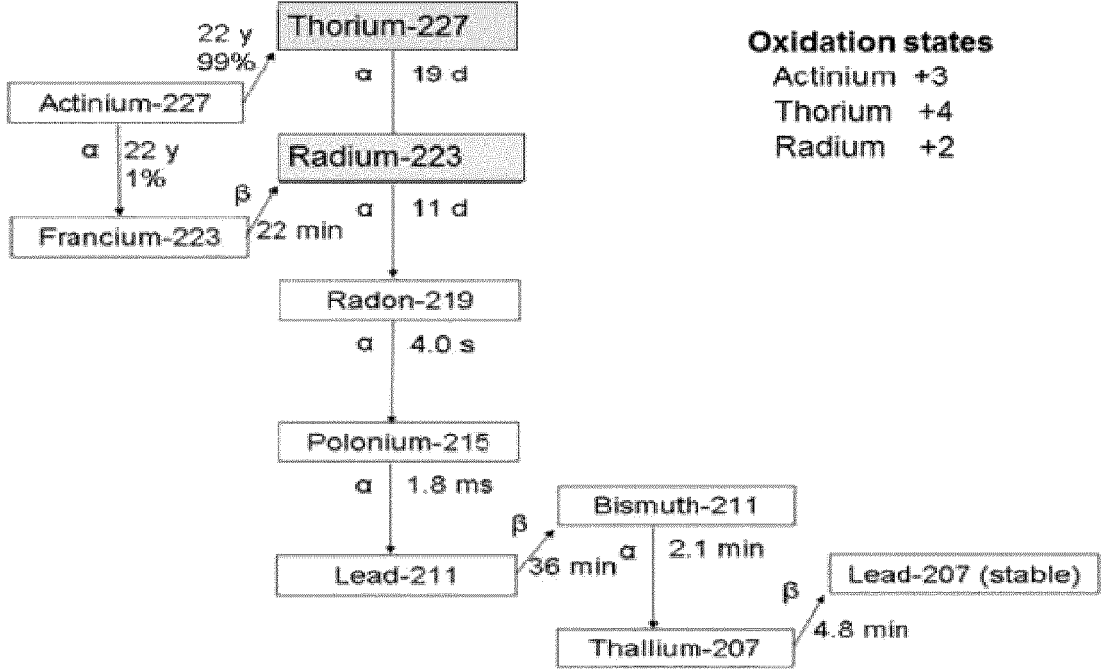
FIG. 4 shows the decay chain of Ac-227 to produce Th-227, Ra-223, Pb-211 and Bi-211.

In some embodiments, irradiation of thorium metal is used to produce Ac-227 (half-life of 21.8 years), Th-227 (half-life of 18.7 days) and Ra-223 (half-life of 11.4 days). In such embodiments, method 120 (FIG. 5) followed by method 50 is carried out to prepare and isolate an Ac-227 product. Method 120 is similar to method 20 as described above, except that the desired product is Ac-227 rather than Ac-225, and like steps in the process have been referred to with reference numerals incremented by 100 and are not further described again. The isolated Ac-227 produced by carrying out methods 120 and 50 then acts as a generator of Th-227, which itself acts as a generator of Ra-223 as shown in FIG. 4.

Figure 5:
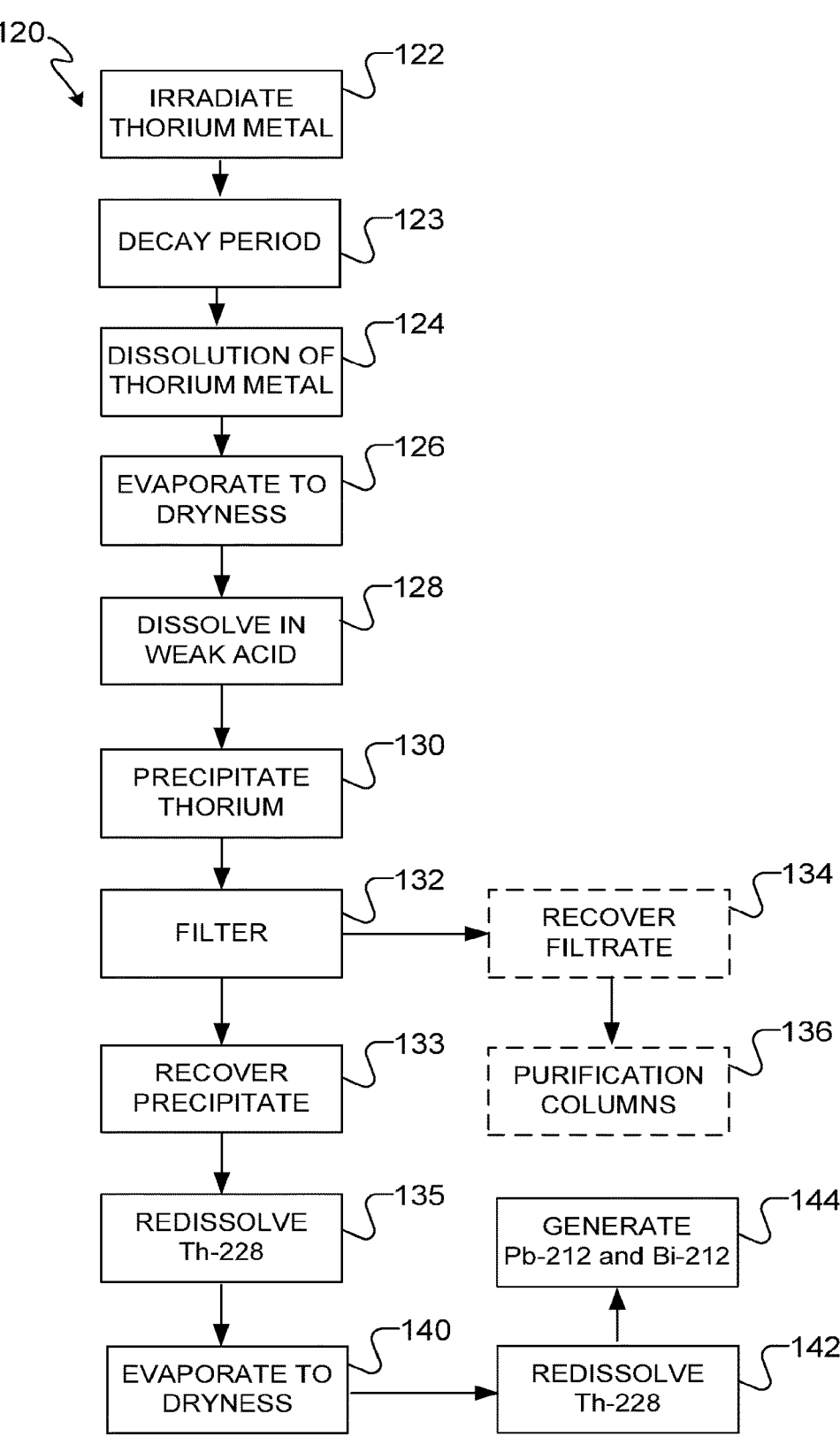
FIG. 5 shows an example embodiment of a method for producing and recovering radium, actinium and thorium isotopes from irradiated thorium metal.

In such embodiments of method 120, as illustrated in FIG. 5, at step 122, the thorium metal is irradiated for a period of time that is longer than the period of irradiation in embodiments in which the desired actinium product is Ac-225. In such embodiments in which the desired product is Ac-227, a decay period 123 is included after step 122, to allow for the decay of shorter-lived actinium isotopes than Ac-227. The remaining steps in method 120 can be carried out in the same manner as described for method 20, i.e. precipitation of a bulk portion of thorium by addition of a selective precipitant at step 130 and filtration at step 132 to separate the precipitate from the filtrate.

Once method 120 has been carried out, the Ac-227 is then separated from the thorium, radium and other spallation products via method 50. Upon completion of method 50, an isolated solution of Ac-227 is obtained as described above for Ac-225.

Figure 6:
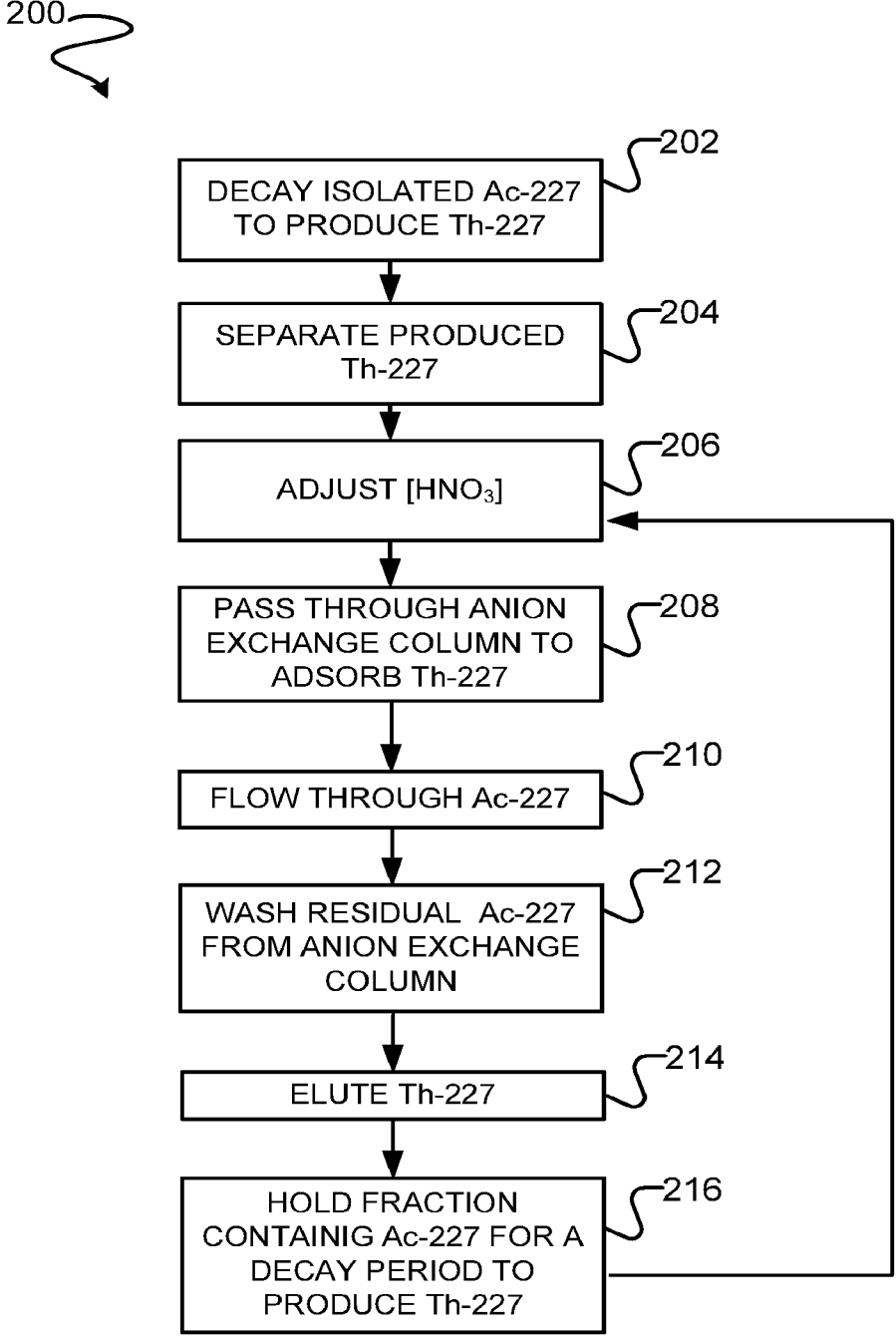
FIG. 6 shows an example embodiment of a method for using a solution containing Ac-227 as a generator of Th-227 and subsequent separation of the produced Th-227.

In some such embodiments, as illustrated as method 200 in FIG. 6, after being isolated, Ac-227 is allowed to decay for a period of time (a decay period) at step 202, e.g. in the range of weeks to months, e.g. 2 weeks, 3 weeks, 4 weeks, 5 weeks, 6 weeks, 2 months, 3 months, 4 months, 5 months, 6 months, or longer to allow grow-in of Th-227. At step 204, the produced Th-227 is then separated from the Ac-227 using ion exchange chromatography in the illustrated embodiment, e.g. by conversion to a nitric acid solution having a nitric acid concentration in the range of between 6 M and 10 M (including e.g. 7, 8 or 9 M, including 8 M in one example embodiment) at step 206, which is then passed through an anion exchange column (e.g. DOWEX™ 1×8 resin) at step 208, e.g. under the conditions as described above for steps 64, 66, 68, so that Th-227 is adsorbed at step 208 while Ac-227 passes through at step 210.

At step 212, residual Ac-227 is then washed from the column with additional nitric acid having a concentration of between 6 M and 10 M (including e.g. 7, 8 or 9 M). At step 214, the Th-227 is then eluted from the column using a solvent in which Th-227 does not bind to the anion exchange resin (e.g. nitric acid having a concentration less than 6 M, e.g. about 0.05 M in one embodiment, including e.g. between 0.01 M and 0.1 M).

At step 216, the fraction containing Ac-227 is optionally retained and held for a decay period, so this anion exchange column step can be repeated again after the Ac-227 has further decayed to yield additional quantities of Th-227 via repetition of steps 206, 208, 210 and 212. Step 216 can optionally be repeated again and the anion exchange column step repeated again as desired. The Ac-227 so obtained thus acts as a generator of Th-227 and Ra-223.

Ra-223 can be separated from the Ac-227 either directly or indirectly from a secondary generator of Th-227 produced as described above for method 200. To directly separate Ra-223 from Ac-227, ion exchange or extraction chromatography can be carried out after a suitable decay period (e.g. for a period of weeks to months, e.g. 2 weeks, 3 weeks, 4 weeks, 5 weeks, 6 weeks, 2 months, 3 months, 4 months, 5 months, 6 months, or longer) of Ac-227 and Th-227 to yield grow-in of desired quantities of Ra-223.

Figure 7:
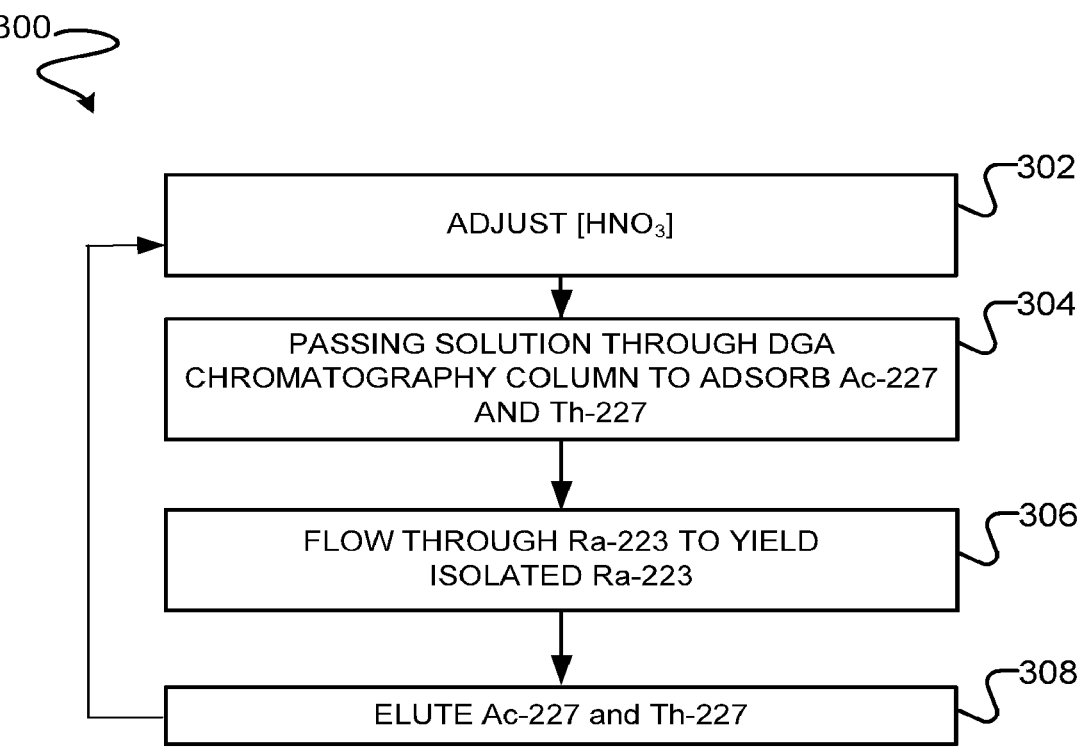
FIG. 7 shows an example embodiment of a method for isolating Ra-223 from Ac-227 and Th-227.

As shown as method 300 in FIG. 7, a first possible method to isolate the produced Ra-223 is to convert the Ac-227/Th-227/Ra-223 solution to a nitric acid solution having a molarity between 2 M and 8 M, including any value therebetween e.g. 3, 4, 5, 6 or 7 M at step 302, followed by passing the solution through a DGA chromatography column containing DGA-normal (TODGA) or DGA-branched (TEHDGA) resin at step 304, which results in adsorption of Ac-227 and Th-227 at step 304 while Ra-223 passes through the column to yield an isolated Ra-223 source at step 306. The Ac-227 and Th-227 can then be recovered from the DGA resin via elution with a weak acid (e.g. nitric acid or hydrochloric acid) having a concentration of approximately 0.05 M (including e.g. between 0.01 M and 0.1 M) at step 308. If desired, the Ac-227 and Th-227 can be allowed to decay for a suitable decay period and the extraction chromatography process repeated to obtain additional Ra-223.

Figure 8:
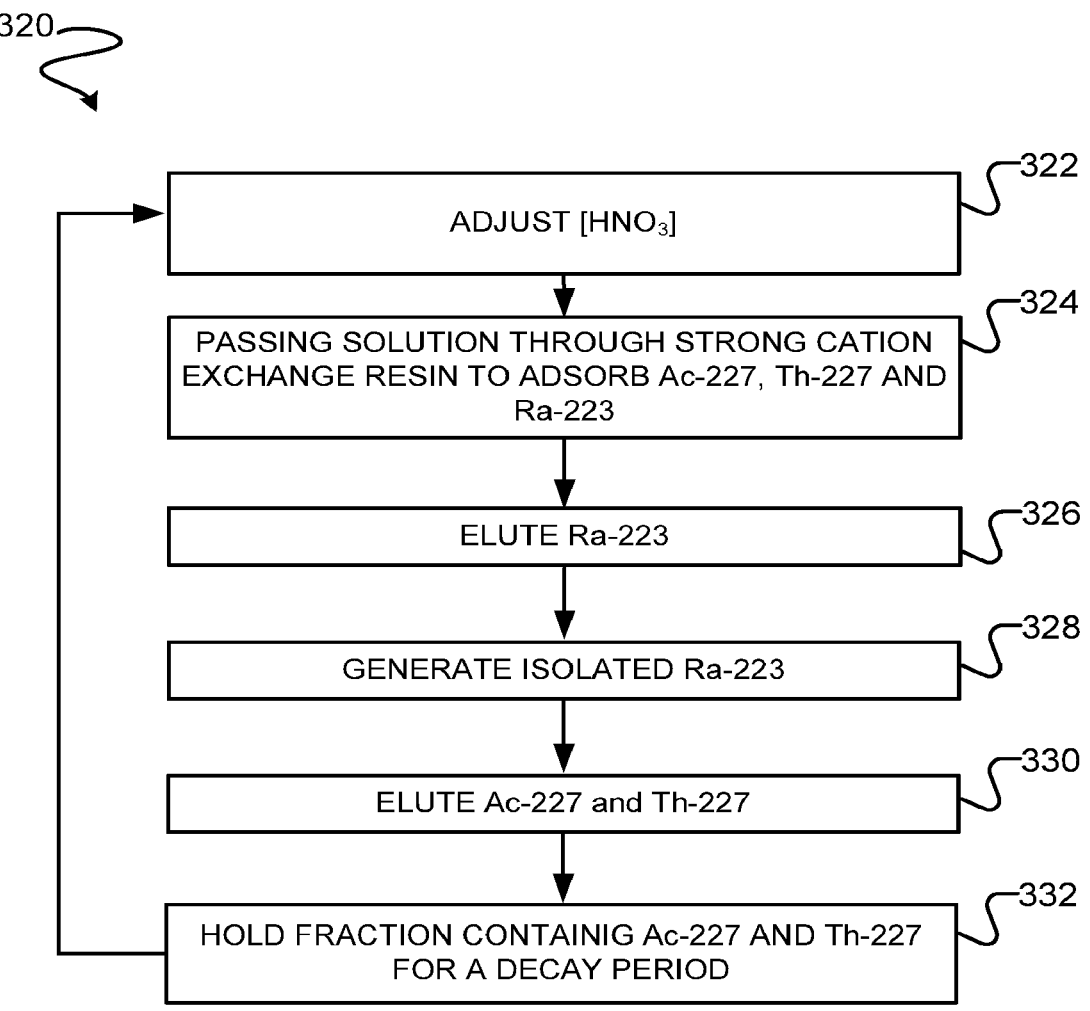
FIG. 8 shows a second example embodiment of a method for isolating Ra-223 from Ac-227 and Th-227.

A second possible method 320 to isolate the produced Ra-223 is shown in FIG. 8. At step 322, the Ac-227/Th-227/Ra-223 solution is converted to a nitric acid solution having a molarity of less than 1 M (including e.g. 0.05 M or less), followed by passing the solution through a column containing a strong cation exchange resin such as DOWEX™ 50× cation exchange resin at step 324 onto which all of Ac-227, Th-227 and Ra-223 will be adsorbed. The Ra-223 is then eluted quickly from the cation exchange resin at step 326 using nitric acid having a concentration of e.g. approximately 2 M (which also elutes Ac-227 and Th-227, but much more slowly than Ra-223), which results in the generation of an isolated Ra-223 source at 328. At step 330, the Ac-227 and Th-227 can then be recovered from the resin by elution with a stronger acid (e.g. 8 M nitric acid).

The recovered fraction containing Ac-227 and Th-227 can be retained for a decay period at step 332, so that Ra-223 can again be separated from actinium and thorium via repetition of steps 322, 324, 326 and 328 after decay of Th-227 has produced additional quantities of Ra-223 (typically a period of days to weeks later, e.g. 2, 3, 4, 5, 6 or 7 days, or 2, 3, 4, 5, 6, 7, or 8 weeks).

In alternative embodiments, indirect separation of Ra-223 from Ac-227 can be done by separation of Ra-223 from isolated Th-227, e.g. via the column chromatography methods described above with respect to methods 300 and 320 as described above.

In one embodiment, a process for production of an Ac-228 (half-life of 1.9 years) generator of medical isotopes such as Ra-224 (half-life of 3.6 days), Pb-212 (half-life of 11.4 days) and Bi-212 (half-life of 61 minutes) is provided.

In such embodiments, proton irradiation of thorium metal is carried out for a long period as described for method 120 (FIG. 5) to produce Th-228. In some embodiments, such irradiation can be carried out for months or even years due to the long half-life of Th-228. At decay period 123, the irradiated thorium target is allowed to decay, allowing for the decay of shorter-lived isotopes other than Th-228. Precipitation of thorium is carried out at step 130 as described for step 30 of method 20, and the precipitated thorium is recovered as thorium oxalate, thorium iodate or thorium peroxide at step 133. At step 135, the precipitated thorium is then re-dissolved in strong nitric acid (e.g. having a concentration in the range of 12-16 M, including any value therebetween e.g. 13, 14 or 15 M nitric acid).

Figure 9:
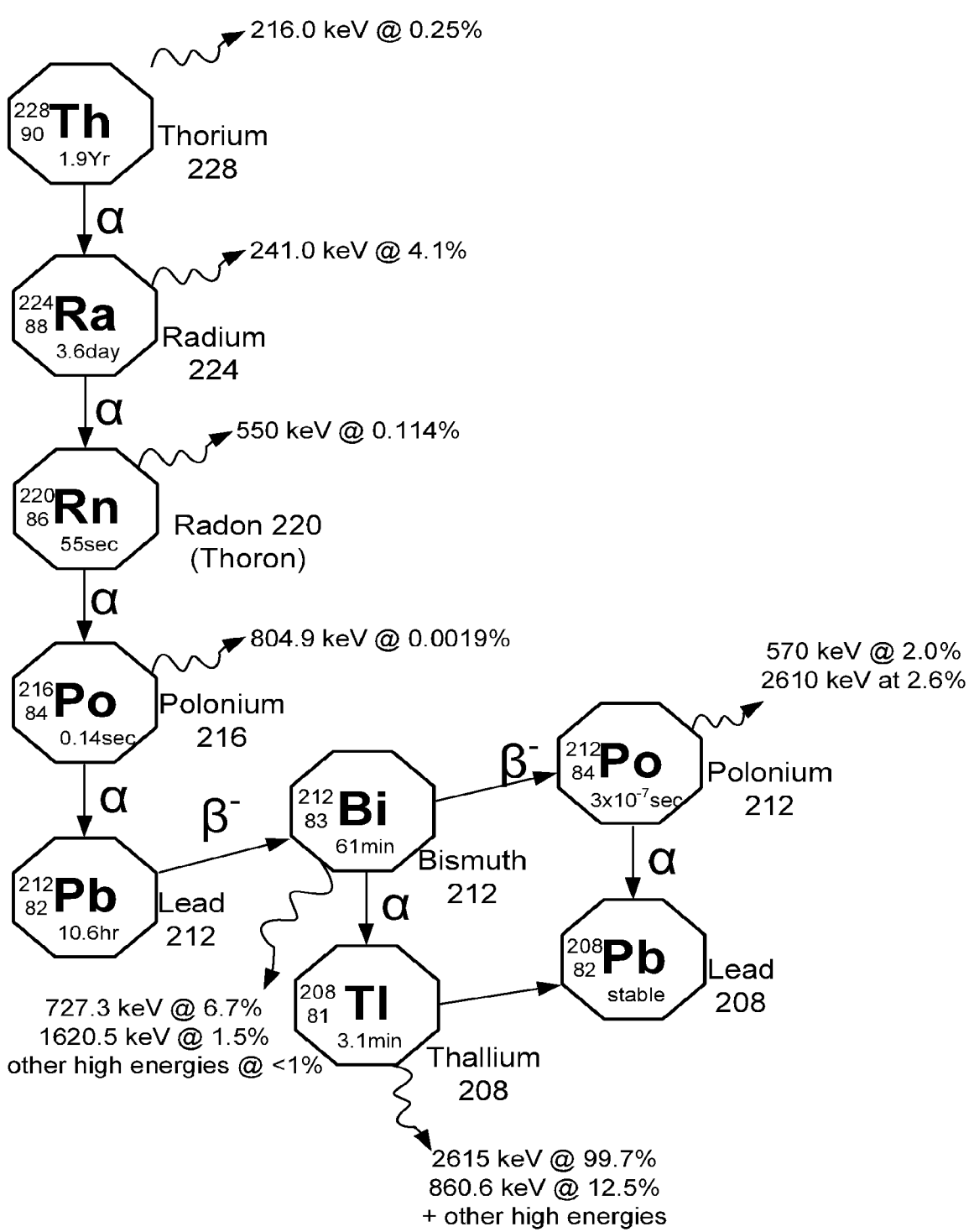
FIG. 9 shows the decay chain of Th-228 to produce Ra-224, Pb-212 and Bi-212.

In some embodiments, as a further part of carrying out method 120, at step 140 the resulting solution in strong nitric acid is evaporated to dryness to obtain dried thorium nitrate salts. At step 142, the resulting thorium nitrate salts, containing Th-228, are then re-dissolved in a solvent suitable for any additionally required fine purification of Th-228, e.g. using repeated precipitations and/or column chromatography. At step 144, the isolated Th-228 then acts as a generator of Ra-224, which itself acts as a generator of Pb-212 and Bi-212, as shown in FIG. 9. Filtrate recovered at step 134 can optionally be purified via purification columns at 136 to obtain other products, e.g. actinium (e.g. as Ac-227) or radium.

In one example embodiment, a process is provided for separation of actinium (Ac) and radium (Ra) isotopes from thorium (Th) metal irradiated with high energy protons (>70 MeV) to be used for the production of the medical isotope Ac-225 and its parent isotope, Ra-225. An aspect of this embodiment of the invention is the use of thorium precipitation for removal of the bulk thorium mass from the Ac and Ra fractions.

One example embodiment of the process is as follows. Thorium metal is dissolved in a mineral acid (e.g. nitric (HNO$_3$), hydrochloric (HCl), or hydrobromic acid (HBr) etc.) with the addition of a small portion of hydrofluoric acid (HF). The solution is then evaporated to dryness. The dried salts are then redissolved in a weak nitric acid (concentration <8M but ideally 1M, minimum of 5 mL of acid per gram of thorium metal initially used). A solution containing hydrogen peroxide or oxalic acid (>1.05-fold molar excess of hydrogen peroxide (H$_2$O$_2$) or oxalic acid (C$_2$H$_2$O$_4$), but ideally 2-fold molar excess) is then added to precipitate the thorium from the solution by the formation of insoluble thorium peroxide or insoluble thorium oxalate, while allowing the actinium and radium isotopes to remain in the solute. The precipitate is then filtered from the solution containing actinium, radium, and any other spallation products that were co-precipitated. The actinium and radium isotopes contained in the filtrate are then separated from residual thorium and other spallation-produced isotopes using a combination of ion exchange and extraction chromatography resins ("columns").

One series of columns for use in an example embodiment is as follows below. The filtrate, diluted to <0.5M nitric acid is passed through a column containing Dowex 50WX8 cation exchange resin (1 mL of resin per gram of thorium metal that is initially used), onto which actinium, radium, and residual thorium are absorbed. The column is then washed with 5-50 column volumes of citric acid (molarity between 0.1 and 1.5 M, and pH between 1.8 and 2.5).

The column is then washed with further with <1 M nitric acid, volume equal to >2 column volumes. Actinium and radium are then removed from the column in nitric acid (concentration between 2 and 16 M, but ideally 8 M—volume depends on concentration but 6 column volumes is sufficient for 8 M nitric acid) and passed through a second column containing Dowex 1×8 anion exchange resin, which will absorb residual thorium and some spallation products (ex. protactinium (Pa), which is produced in significant quantities). The actinium and radium pass through this second column and thorium will stick to the resin depending on concentration (ideal concentration is 8-10 M).

The solution is then diluted to 2-8 M nitric acid (ideally 4 M) and loaded onto a third column containing DGA-branched (TEHDGA) or DGA-normal (TODGA) resin. Under these conditions, radium will pass through the column while actinium remains on the DGA resin. This column is then washed with nitric acid. The actinium is then removed from the column in nitric acid of concentration >10 M. The solution containing radium in 4 M nitric acid is retained as a generator of other actinium isotopes (repetition of the third column after Ac-225 has grown in will result in isolation of a second Ac-225 product).

With reference to FIG. 10, an example embodiment of an apparatus for the production and separation of actinium and radium isotopes from irradiated thorium metal 500 is schematically illustrated. Some example embodiments of methods 20 and 50 can be carried out using apparatus 500.

A proton irradiation apparatus 502 is provided to irradiate thorium metal with high energy protons. In some embodiments, proton irradiation apparatus 502 is a particle accelerator such as a cyclotron.

Apparatus 500 also has a dissolving vessel 503 for dissolving the irradiated thorium metal, including the produced actinium and/or radium, in a mild acid solution, including a mild mineral acid, and including mild nitric acid in some embodiments.

Apparatus 500 also includes a precipitation vessel 504 that can be used to precipitate dissolved thorium metal by addition of a suitable precipitant after it has been irradiated by proton irradiation apparatus 502.

Apparatus 500 also includes a filter 505 to separate precipitated thorium metal from the filtrate containing actinium and radium ions.

Apparatus 500 also includes a series of columns for separating actinium and radium isotopes from thorium and other spallation products generated by proton irradiation apparatus 502. In the illustrated embodiments, apparatus 500 is provided with a strong cation exchange column 506, an anion exchange column 508, and a DGA column 510.

With reference to FIG. 11, a second example embodiment of an apparatus for the production and separation of actinium and radium isotopes from irradiated thorium metal 600 is schematically illustrated. Some example embodiments of methods 20 and 50 can be carried out using apparatus 600.

A proton irradiation apparatus 602 is provided to irradiate thorium metal with high energy protons. In some embodiments, proton irradiation apparatus 602 is a particle accelerator such as a cyclotron.

Apparatus 600 also includes a dissolving vessel 603 for dissolving the irradiated thorium metal, including the produced actinium and/or radium, in a mild acid solution, e.g. a mild mineral acid solution in some embodiments, e.g. a mild nitric acid solution in some embodiments.

Apparatus 600 also includes a precipitation vessel 604 that can be used to precipitate dissolved thorium metal by addition of a suitable precipitant after it has been irradiated by proton irradiation apparatus 602.

Apparatus 600 also includes a filter 605 to separate precipitated thorium metal from the filtrate containing actinium and radium ions.

Apparatus 600 also includes a series of columns for separating actinium and radium isotopes from thorium and other spallation products generated by proton irradiation apparatus 602. In the illustrated embodiments, apparatus 600 is provided with a strong cation exchange column 606 and a DGA column 610.

In some embodiments, strong cation exchange column 506 or 606 contains an ion exchange resin having a sulfonic acid functional group, e.g. BIORAD™ AG50W, BIO-RAD™ AG 50WX4 or AG502X8 H$^+$ form, BIORAD™ AG MP-50 macroporous resin, DOWEX™ 50WX8, or the like.

In some embodiments, anion exchange column 508 contains an strongly basic ion exchange resin having quaternary amino groups, e.g. Dowex™ 1×8 anion exchange resin.

In some embodiments, DGA column 510 or 610 contains a DGA resin such as a DGA-branched (TEHDGA) or DGA-normal (TODGA) resin.

While exemplary chromatographic columns, techniques and conditions have been set forth above, any suitable chromatographic columns, techniques and conditions suitable for the separation of the ions to be separated could be used in alternative embodiments.

EXAMPLES

Some embodiments are further described with reference to the following examples, which are intended to be illustrative and not limiting in nature.

Example 1.0—Thorium Target Irradiation to Produce Radioisotopes

A sample target received proton irradiation at a cyclotron facility of 85 uA for a total of 31 hours. This produced 11.7 mCi of Ac-225 and 2.1 mCi of parent Ra-225. Other isotopes of interest produced include Th-228 (~1 mCi), which is a generator of Pb-212.

Irradiated thorium is dissolved in a combination of nitric and hydrofluoric acids. The majority of thorium is then removed by addition hydrogen peroxide, forming a thorium peroxide precipitate easily filtered with minimal Ac or Ra losses. The filtered precipitate is redissolved in strong nitric acid and used as a Th228/Ra-224/Pb-212 generator. For the filtrate, ion exchange and extraction chromatography resins are used to isolate Ac and Ra from remaining trace Th quantities and other spallation products. This provides two Ac-225 products with different profiles: directly-produced Ac-225 contains long-lived Ac-227, while Ac-225 produced from decay of the isolated Ra-225 fraction is Ac-227 free.

Example 2.0—Optimization of Conditions for Precipitation of Thorium Metal

Experiments were conducted to evaluate a variety of different precipitation conditions for effectiveness in precipitating thorium ions from weak nitric acid solution without resulting in co-precipitation of desired actinium or radium ions. Results are shown in FIG. 12.

Briefly, different selective precipitants, in this example oxalic acid, iodic acid or hydrogen peroxide, were added to a nitric acid solution containing dissolved thorium to yield the indicated concentration of nitric acid (i.e. the precipitation conditions had the indicated concentration of nitric acid). The concentration of the precipitant at the start of the reaction is listed in FIG. 12. Precipitation was conducted at the indicated temperature (in the range of room temperature to 120° C.) and time (between 0.2 and 3 hours), and the resulting precipitate was filtered. The filtrate was evaluated for the mass of thorium remaining (nd indicates not determined; determinations were made using either photometric UV absorption or a Th-227 radiotracer), as well as yield of radium and actinium (in some experiments yields of radium or actinium were observed to be greater than 100% due to experimental error). The characteristics of the resulting precipitate were noted, including the ease with which the precipitate could be filtered.

Under the conditions tested, it was observed that thorium precipitated at nitric acid concentrations as low as 0.007 M (the lowest concentration of nitric acid tested). At this concentration, greater than 75% yields of both actinium and radium in the filtrate were obtained, while the lowest amount of residual thorium in the filtrate was observed. The precipitate formed at this concentration low concentration of nitric acid was gelatinous and difficult to filter. Similar results were observed under the tested conditions at nitric acid concentrations of 0.07 M and 0.4 M.

As a general observation, the higher the concentration of nitric acid present during the precipitation period, the lower the amount of thorium that was observed to precipitate. Without being bound by theory, it is believed that the decreased precipitation of thorium at higher nitric acid concentrations may be due to the decomposition of hydrogen peroxide by nitric acid.

As a further general observation, at slightly higher concentrations of nitric acid, e.g. in the range of 0.5 to 1.25 M under the conditions tested, higher yields of radium and actinium are obtained (>85% and frequently >95% under the tested conditions. Although the amount of thorium removed under such conditions is decreased relative to lower nitric acid concentrations, the precipitate produced under these conditions was not gelatinous and was easier to filter.

Example 3.0—Example Separation of Ac and Ra from Th

Figure 13:
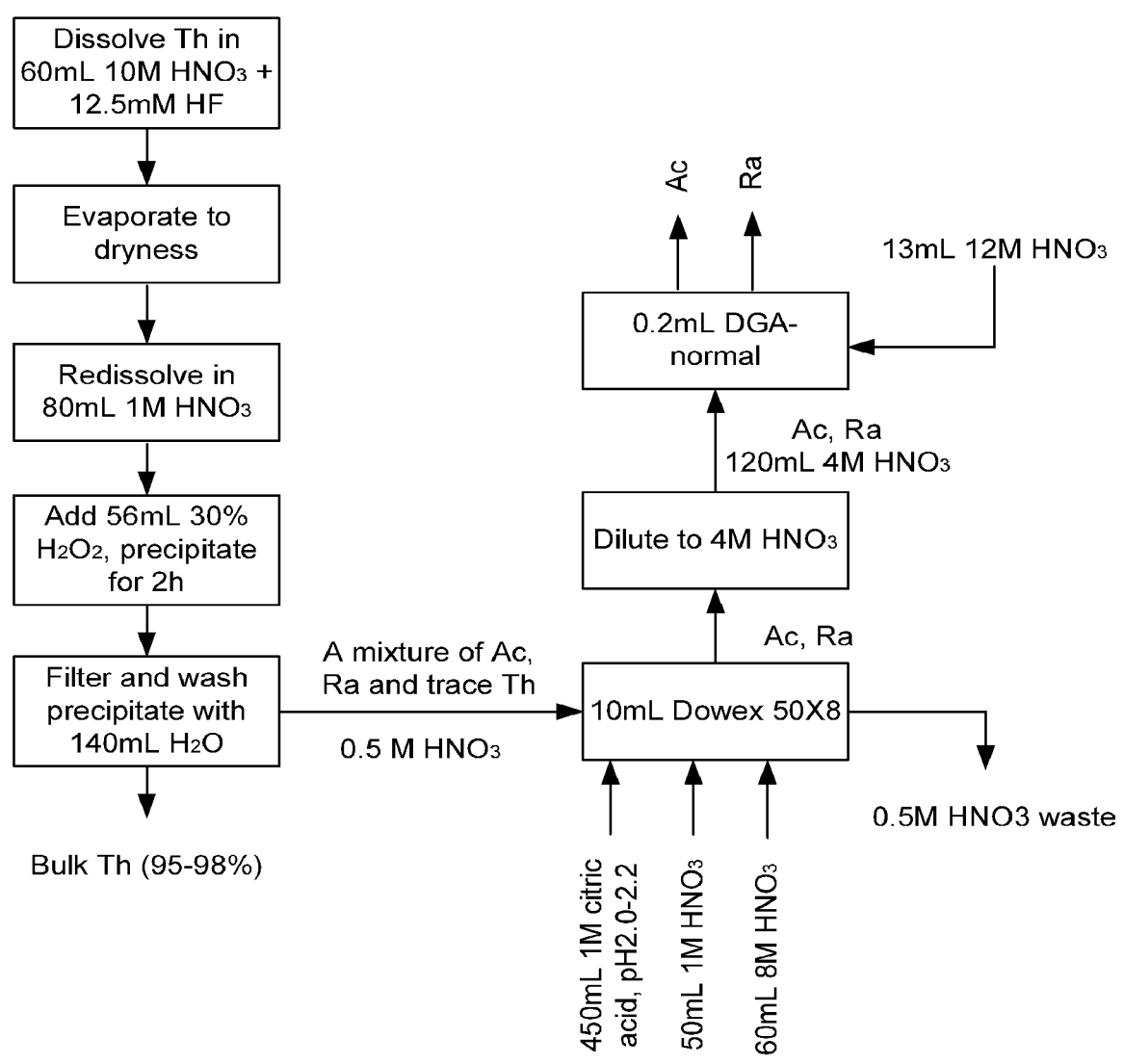
FIG. 13 shows an example embodiment of a method for producing and separating actinium and radium from thorium metal.

An example separation of actinium and radium from thorium metal was carried out following the protocol shown in FIG. 13. Briefly, purification of Ac-225 from thorium metal irradiated with 480 MeV protons was performed using the procedure described in FIG. 13. This process involves thorium dissolution, removal of the bulk thorium mass by precipitation of thorium peroxide by addition of hydrogen peroxide, a cation exchange column and finally an extraction chromatography column.

To evaluate the separation of thorium, actinium and radium throughout this process, the method was conducted three times using non-irradiated material. 8 g of thorium (20 g of thorium nitrate tetrahydrate) was used instead of thorium metal for these tests. The behaviour of actinium and radium through the process was monitored using gamma ray spectroscopy of the Ac-228 and Ra-224 present naturally in the Th-232 decay chain, as well as Ac-225 and Ra-225 tracers that were added to the initial thorium nitrate solution. The behaviour of Th through the process was monitored by colorimetry with the Arsenazo III complex, as well as a Th-227 tracer which was added before the cation column stage (i.e. after the precipitation).

Figure 14:
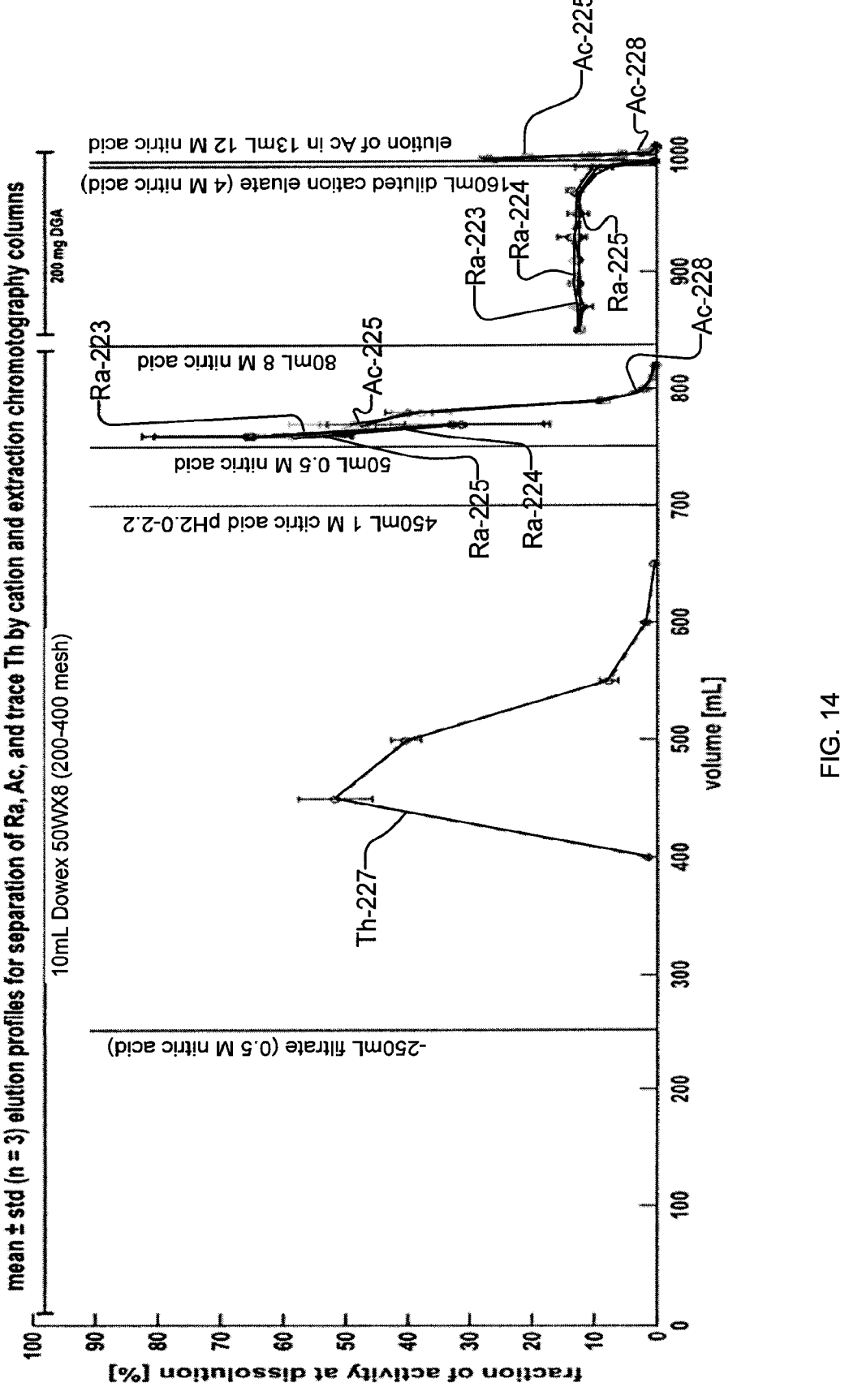
FIG. 14 shows the elution profiles of thorium, radium and actinium through cation and extraction chromatography stages of an exemplary purification process.
Figure 15:
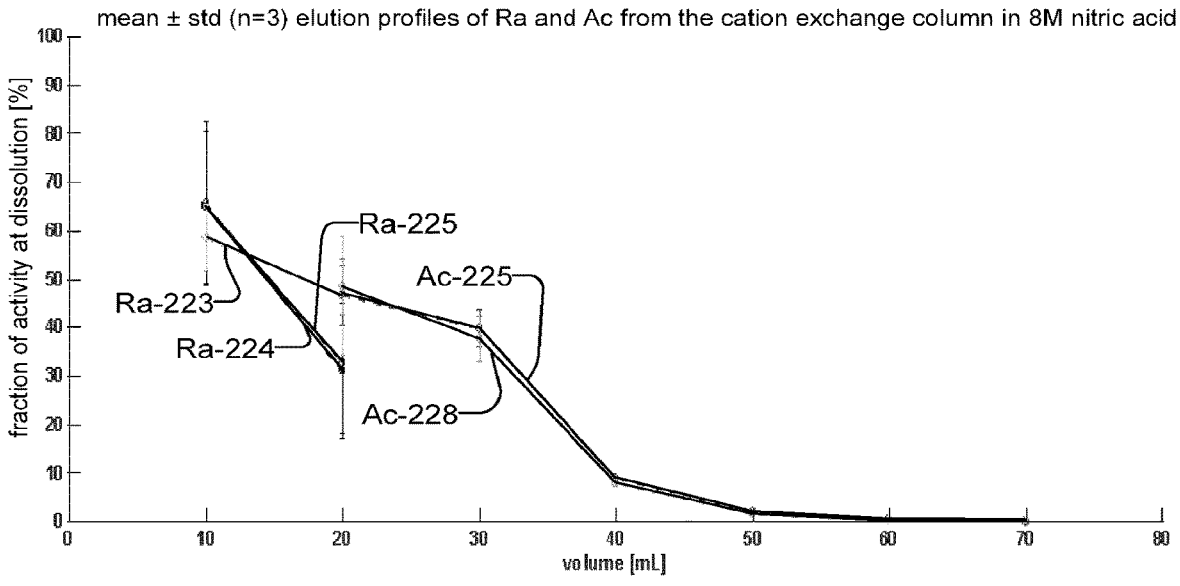
FIG. 15 shows the elution profile of radium and actinium from a cation exchange column in one example embodiment.
Figure 16:
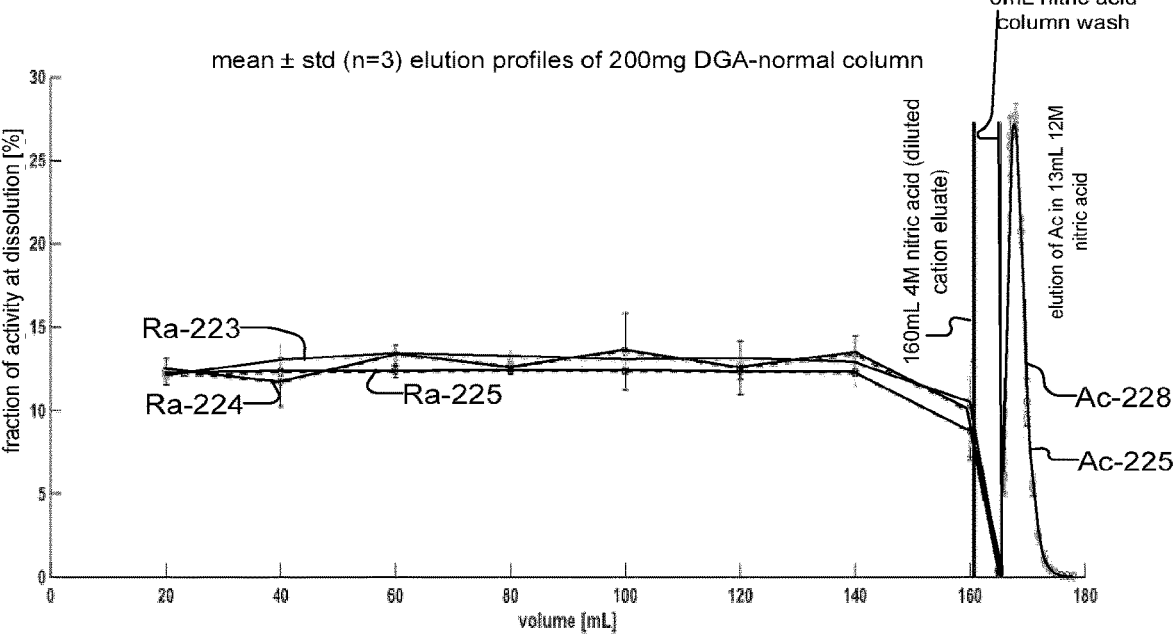
FIG. 16 shows the elution profile of radium and actinium from an extraction chromatography column in one example embodiment.

FIG. 14 shows the separation of thorium, radium and actinium on the cation and extraction chromatography columns, while FIGS. 15 and 16 show details of the cation exchange and extraction chromatography steps, respectively. Averaged (±stdev) over three test runs, the Ra and Ac yields in their final fractions were (97.3±3.2) % and (99.6±0.8) %, respectively. In all cases, <0.5% of Ra and Ac were detected in the precipitate.

With reference to FIG. 14, the elution profile of thorium, radium and actinium is shown through both the cation and extraction chromatography stages of the purification process. The cation exchange resin used was 10 mL of Dowex™ 50WX8 (200-400 mesh), and the extraction chromatography resin used was 200 mg of DGA. Results shown are the average±standard deviation for three replicate experiments.

With reference to FIG. 15, the elution profile of radium and actinium from the cation exchange column in 8 M nitric acid is shown. Each data point represents the average±standard deviation across three replicates of the procedure.

With reference to FIG. 16, the elution profile of radium and actinium from the extraction chromatography column is shown. Each data point represents the average±standard deviation across three replicates of the procedure. Actinium binds to the DGA-normal column, and in this embodiment is eluted in 13 mL of 12 M nitric acid, which is a relatively small elution volume.

Figure 17:
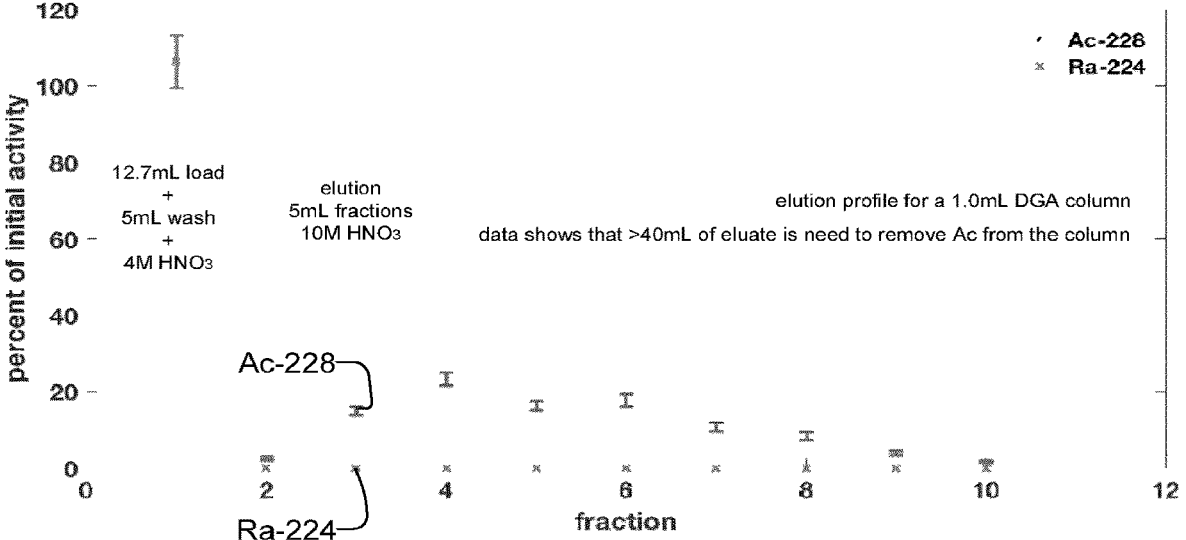
FIG. 17 shows the elution of Ac-228 and Ra-224 from an exemplary 1.0 mL DGA-normal column.

FIG. 17 shows the elution of Ac-228 and Ra-224 from an exemplary 1.0 mL DGA-normal column. Data points are the average of three experiments±standard deviation. Ac-228 was recovered via elution with just over 40 mL of 10 M nitric acid, while Ra-224 was retained on the column (note that the data point in the initial sample for Ac-228 is obscured behind the data point for Ra-224 but was present at approximately 100%).

REFERENCES

The following references are of interest with respect to the subject matter described herein. Each of the following references is incorporated by reference herein in its entirety.

E. K. Hyde, *The Radiochemistry of Thorium*, vol. NAS-NS 300. Berkeley, California: Subcommittee on Radiochemistry, National Academy of Sciences—National Research Council, 1960.

R. A. Hasty and J. E. Boggs, "Isotopic exchange study on thorium peroxide," *J. Inorg. Nucl. Chem.*, vol. 33, pp. 874-876, 1971.

R. A. Hasty and J. E. Boggs, "Formation and Properties of Thorium Peroxide," *J. Less-Common Met.*, vol. 7, pp. 447-452, 1964.

S. S. Galley, C. E. Van Alstine, L. Maron, and T. E. Albrecht-Schmitt, "Understanding the Scarcity of Thorium Peroxide Clusters," *Inorg. Chem.*, vol. 56, no. 21, pp. 12692-12694, 2017.

G. L. Johnson, M. J. Kelly, and D. R. Cuneo, "Reactions of aqueous thorium nitrate solutions with hydrogen peroxide," *J. Inorg. Nucl. Chem.*, vol. 27, no. 8, pp. 1787-1791, 1965.

A. Abrão, A. A. De Freitas, and F. M. S. De Carvalho, "Preparation of highly pure thorium nitrate via thorium sulfate and thorium peroxide," *J. Alloys Compd.*, vol. 323, no. 324, pp. 53-56, 2001.

V. Radchenko, J. W. Engle, J. J. Wilson, J. R. Maassen, F. M. Nortier, W. A. Taylor, E. R. Birnbaum, L. A. Hudston, K. D. John, and M. E. Fassbender, "Application of ion exchange and extraction chromatography to the separation of actinium from proton-irradiated thorium metal for analytical purposes.," *J. Chromatogr.* A, vol. 1380, pp. 55-63, February 2015.

US2015/0292061 to Fassbender et al.

V. Tsoupko-Sitnikov, Y. Norseev, and V. Khalkin, "Generator of actinium-225," in *Journal of Radioanalytical and Nuclear Chemistry*, 1996, pp. 75-83.

V. Radchenko, T. Mastren, C. A. L. Meyer, A. S. Ivanov, V. S. Bryantsev, R. Copping, D. Denton, J. W. Engle, J. R. Griswold, K. Murphy, J. J. Wilson, A. Owens, L. Wyant, E. R. Birnbaum, J. Fitzsimmons, D. Medvedev, C. S. Cutler, L. F. Mausner, M. F. Nortier, K. D. John, S. Mirzadeh, and M. E. Fassbender, "Radiometric evaluation of diglycolamide resins for the chromatographic separation of actinium from fission product lanthanides," *Talanta*, vol. 175, no. July, pp. 318-324, 2017.

E. P. Horwitz, D. R. McAlister, A. H. Bond, and R. E. Barrans, "Novel Extraction of Chromatographic Resins Based on Tetralkyldiglycolamides: Characterization and Potential Applications," *Solvent Extr. Ion Exch.*, vol. 23, pp. 319-344, 2005.

U.S. Pat. No. 7,553,461 to Horowitz et al.

U.S. Pat. No. 9,951,399 to Fassbender et al.

U.S. Pat. No. 9,790,573 to Mreno Bermudez et al.

U.S. Pat. No. 9,555,140 to Birnbaum et al.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A method of producing thorium radioisotopes, the method comprising:

irradiating thorium metal to produce thorium radioisotopes;

dissolving the irradiated thorium metal in a strong mineral acid containing fluoride and drying the resulting solution;

further dissolving the irradiated thorium metal in a weak acid to yield a first solution comprising dissolved thorium;

adding a selective precipitant and precipitating a bulk portion of the dissolved thorium under precipitation conditions while leaving a second solution, wherein the selective precipitant comprises hydrogen peroxide or oxalic acid and wherein the weak acid is provided at a concentration of between about 0.005 M to about 4 M; and filtering to separate the precipitated thorium product from the second solution.

2. The method as defined in claim 1, wherein the thorium comprises Th-228, the method further comprising using the Th-228 as a generator for producing one or more of Ra-224, Pb-212 or Bi-212.

3. The method as defined in claim 1, comprising, after said irradiating but before said dissolving, waiting for a decay period to allow for decay of isotopes having a shorter half-life than Th-228.

4. The method as defined in claim 1, wherein the selective precipitant comprises hydrogen peroxide.

5. The method as defined in claim 1, wherein the weak acid comprises a mineral acid.

6. The method as defined in claim 1, wherein the weak acid comprises nitric acid.

7. The method as defined in claim 1, wherein the selective precipitant is added in at least a 1.05-fold to 3.0-fold molar excess relative to an amount of thorium metal present during the irradiating step, or wherein the concentration of the selective precipitant in the precipitation conditions initially comprises between about 0.01 M and about 4.0 M.

8. The method as defined in claim 1, wherein the precipitation conditions comprise a concentration of nitric acid between about 0.5 M to about 0.75 M.

9. The method as defined in claim 1, wherein the precipitation conditions comprise ambient temperature.

10. The method as defined in claim 1, wherein the bulk portion of the dissolved thorium comprises at least 60% of the dissolved thorium in the weak acid solution or in the second solution.

11. The method as defined in claim 1, wherein the strong mineral acid comprises nitric acid having a concentration of between 8 M and 12 M.

12. The method as defined in claim 1, wherein the thorium comprises Th-228.

13. The method as defined in claim 1, wherein the precipitated thorium product is recovered.

14. The method as defined in claim 13, wherein the step of recovering the precipitated thorium product comprises redissolving the precipitated thorium to yield a generator solution containing Th-228 radionuclides.

15. The method as defined in claim 14, wherein the step of redissolving the precipitated thorium comprises dissolving the precipitated thorium in a strong acid.

16. The method as defined in claim 14, further comprising using the generator solution to generate Ra-224, Pb-212 or Bi-212.

17. The method as defined in claim 1, further comprising allowing the irradiated thorium metal to decay to allow decay of shorter-lived isotopes other than Th-228.

18. The method as defined in claim 15, further comprising evaporating the redissolved precipitated thorium to dryness to produce thorium salts.

19. The method as defined in claim 18, further comprising redissolving the thorium salts in a solvent for fine purification of Th-228.

20. A method of producing thorium radioisotopes, the method comprising:

irradiating thorium metal to produce thorium radioisotopes;

dissolving the irradiated thorium metal in strong nitric acid having a concentration of between about 8 M and about 12 M and containing fluoride and drying the resulting solution;

redissolving the irradiated thorium metal in weak nitric acid having a concentration of between about 0.005 M to about 4 M to yield a first solution comprising dissolved thorium;

adding a selective precipitant and precipitating a bulk portion of the dissolved thorium under precipitation conditions while leaving a second solution, wherein the selective precipitant comprises hydrogen peroxide at a 1.05- to 5.0-fold molar excess relative to an amount of thorium metal present during the irradiating step and the precipitation conditions comprise ambient temperature; and filtering to separate the precipitated thorium product from the second solution.

21. A method of producing thorium radioisotopes, the method comprising:

irradiating thorium metal to produce thorium radioisotopes;

dissolving the irradiated thorium metal in a strong mineral acid and drying the resulting solution;

further dissolving the irradiated thorium metal in a weak acid to yield a first solution comprising dissolved thorium;

adding a selective precipitant and precipitating a bulk portion of the dissolved thorium under precipitation conditions while leaving a second solution, wherein the selective precipitant comprises hydrogen peroxide and wherein the weak acid is provided at a concentration of between about 0.005 M to about 4 M; and filtering to separate the precipitated thorium product from the second solution;

wherein the strong mineral acid contains fluoride.

* * * * *